United States Patent [19]
Sawai et al.

[11] Patent Number: 5,807,961
[45] Date of Patent: Sep. 15, 1998

[54] POLYAMIC ACID, POLYIMIDE FILM AND LIQUID CRYSTAL ALIGNING FILM AND LIQUID CRYSTAL DISPLAY ELEMENT USING THE FORMERS

[75] Inventors: Toshiya Sawai; Masaaki Yazawa, both of Chiba; Seiji Oikawa, Fukuoka; Shizuo Murata, Chiba; Masaharu Hayakawa, Chiba; Etsuo Nakagawa, Chiba, all of Japan

[73] Assignee: Chisso Corporation, Osaka, Japan

[21] Appl. No.: 860,013

[22] PCT Filed: Oct. 17, 1996

[86] PCT No.: PCT/JP96/03029

§ 371 Date: Jun. 20, 1997

§ 102(e) Date: Jun. 20, 1997

[87] PCT Pub. No.: WO97/14742

PCT Pub. Date: Apr. 24, 1997

[30] Foreign Application Priority Data

Oct. 20, 1995 [JP] Japan .................................... 7-297531

[51] Int. Cl.⁶ .......................... C08G 73/10; C09K 19/30; G02F 1/1337

[52] U.S. Cl. .............................. 528/170; 528/25; 528/26; 528/28; 528/125; 528/128; 528/172; 528/173; 528/174; 528/176; 528/183; 528/185; 528/188; 528/220; 528/229; 528/350; 528/353; 428/473.5; 359/173

[58] Field of Search .................................. 528/25, 26, 28, 528/125, 128, 170, 172, 173, 174, 176, 183, 185, 188, 220, 229, 350, 353; 428/473.5; 359/173

[56] References Cited

U.S. PATENT DOCUMENTS

| | | | |
|---|---|---|---|
| 5,122,295 | 6/1992 | Weber et al. | 252/299.01 |
| 5,378,395 | 1/1995 | Weber et al. | 252/299.63 |
| 5,449,705 | 9/1995 | Wanatabe et al. | 522/148 |
| 5,519,525 | 5/1996 | Weber et al. | 359/103 |

FOREIGN PATENT DOCUMENTS

| | | |
|---|---|---|
| 0365962 | 5/1990 | European Pat. Off. . |
| 0381506 | 8/1990 | European Pat. Off. . |
| 0564299 | 10/1993 | European Pat. Off. . |

*Primary Examiner*—P. Hampton-Hightower
*Attorney, Agent, or Firm*—McDermott, Will & Emery

[57] ABSTRACT

This invention is directed to a polyimide film useful as use applications for electronic materials; a liquid crystal aligning film using the same; a liquid crystal display element provided with the liquid crystal aligning film; and a polyamic acid used as a raw material of the polyimide constituting the polyimide film.

The polyimide used for preparing the above polyimide films, consists of a diamine component, the 50% by mol or more based upon the total diamine, of which is a diamine having a core structure having no polar group such as 1,2-bis(4-(4-aminobenzyl)phenyl)ethane, 1,6-bis(4-(4-aminobenzyl)phenyl)hexane, 1,1-bis(4-(4-aminobenzyl)phenyl)heptane, etc., and a tetracarboxylic acid dianhydride, and if necessary, an aminosilicon compound, is used as a liquid crystal aligning film.

16 Claims, 4 Drawing Sheets

POLYAMIC ACID, POLYIMIDE FILM AND LIQUID CRYSTAL ALIGNING FILM AND LIQUID CRYSTAL DISPLAY ELEMENT USING THE FORMERS

TECHNICAL FIELD

This invention is directed to a polyimide film useful as use applications for electronic materials; a liquid crystal aligning film using the same; a liquid crystal display element provided with the liquid crystal aligning film; and a polyamic acid used as a raw material of the polyimide constituting the polyimide film.

BACKGROUND ART

For liquid crystal display elements used for watches, electronic calculator, etc., a twist.nematic (hereinafter abbreviated to TN) mode having a structure wherein the aligning direction of nematic liquid crystals is twisted by 90° between a pair of upper and lower electrode substrates, has been mainly employed. Further, super twisted nematic (hereinafter abbreviated to STN) mode wherein the twist-.angle has been increased to 180° to 300° has been developed; thus even in the case of a large picture surface, a liquid crystal display element having a superior display grade has been obtained.

Further, in recent years, since matrix display, color display, etc. have been carried out, MIM (metal-insulating phase-metal) element having employed an active type twist-.nematic mode wherein a large number of picture element electrodes are provided and ON-OFF thereof can be carried out, and TFT (electric field effect type thin film transistor) element have been vigorously developed.

A problem common in all of these modes consists in that the following phenomenon occurs:
the same picture surface is displayed for a long time, and when the surface is then shifted to another picture surface, the prior picture remains as a remaining one (image sticking). Particularly, in order to obtain a high grade, liquid crystal display element, improvement in the above image sticking is a very important problem.

The cause of the above image sticking is considered as follows:
due to the DC component impressed to the liquid crystal display element, an electric double layer is formed by the ion component of impurities contained in the liquid crystals present on the surface of the aligning film, and as a result, an electric charge deviation occurs between the upper and lower substrates and since the deviation is kept stable, a potential difference occurs, resulting in the above image sticking. Particularly, in the case of TFT element, since it is impossible to remove the DC component, in view of the characteristic of the element, the image sticking is more conspicuous as compared with the cases of TN and STN elements; hence this fact is serious.

Further, in the case of TFT mode, in order to prevent the picture surface from flicker, there has been required an aligning film holding a high voltage holding ratio even in the case of 60° C. to 90° C. at which the voltage holding ratio is notably lowered.

As aligning films used for such liquid crystal display elements, organic films such as those of polyimide, polyamide, etc. have been mainly used. For example, Japanese patent application laid-open No. Sho 51-65960 discloses a liquid crystal display element provided with a liquid crystal-aligning film using a polyimide resin having repetition units expressed by the following formula:

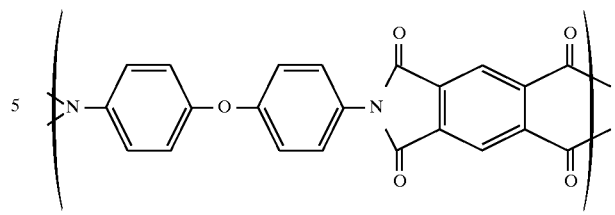

However, in the case of such an element using a polyimide aligning film obtained by using a compound having such an ether bond, image sticking or Vth unevenness is liable to occur.

The object of the present invention is to solve the above problems, and to provide a polyimide film which has no image sticking, has a high voltage holding ratio over low temperatures to high temperatures, and further does not generate any Vth unevenness at the peripheral part of liquid crystal panel even in an atmosphere of high temperature and high humidity; a liquid crystal aligning film and a liquid crystal display element using the same; and a polyamic acid as a raw material of the polyimide.

DISCLOSURE OF INVENTION

The present inventors have made extensive research and development of the art, and as a result, have found that the above image sticking, voltage holding ratio and Vth unevenness have a correlation to the polarity of the surface of aligning film, and when a diamino compound having a specified structure capable of reducing the polarity is used, a liquid crystal aligning film is obtained, which film can suppress the image sticking, has a high voltage holding ratio over low temperature to high temperature, and does not generate any Vth unevenness at the peripheral part of the liquid crystal panel even in an atmosphere of high temperature and high humidity; thus the present inventors have completed the present invention.

The diamino compound has no polar group such as —O— and —$SO_2$—, and has a high molecular weight; hence when it is used as a raw material of polyimide, it is possible to relatively reduce the proportion of an imide group having a high polarity. Accordingly, it is possible to obtain a polyimide having a lower polarity.

The contents of the present invention will be described in more detail.
(1) A polyimide film obtained by imidizing a polyamic acid, which polyamic acid consists of structural units expressed by the following formulas (I) and (II):

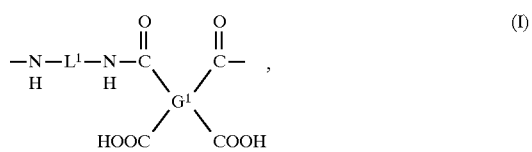

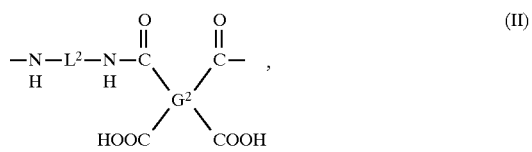

wherein the structural unit represented by the formula (I) is 50 to 100% by mol, and
the molecular terminal is an amino group or an acid anhydride group or a carboxyl group obtained by hydrating the acid anhydride group, or a group expressed by the formula (III):

and said polyamic acid has a logarithmic viscosity number of 0.1 to 5 dl/g as measured in N-methyl-2-pyrrolidone, in a concentration of 0.5 g/dl and at a temperature of 30°±0.01° C., in the above formulas (I) and (II), $G^1$ and $G^2$ each express the same or different tetravalent organic groups of 4 to 30 carbon atoms, including at least one of an aromatic group and an alicyclic group; $L^1$ is expressed by the formula (IV),

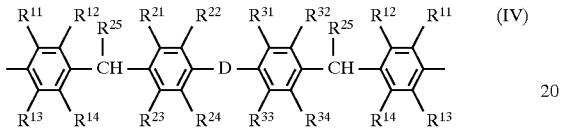

and $L^2$ is expressed by a divalent aliphatic group of 2 to 12 carbon atoms or a divalent organic group of 4 to 36 carbon atoms, different from $L^1$, the organic group including one member or more of an aromatic group and an alicyclic group, or a polysiloxane group expressed by the formula (V):

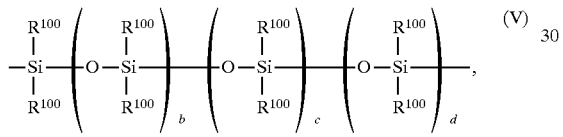

in the formula (III), Z expresses an alkylene group of 2 to 10 carbon atoms or a phenylene group; $R^{45}$ expresses an alkyl group or an alkenyl group of 1 to 10 carbon atoms or a phenyl group; $R^{46}$ expresses an alkyl group, an alkenyl group or an alkoxyalkyl group of 1 to 10 carbon atoms or a phenyl group; and m expresses an integer of 1 to 3, in the formula (IV), $R^{11}, R^{12}, R^{13}, R^{14}, R^{21}, R^{22}, R^{23}, R^{24}, R^{25}, R^{31}, R^{32}, R^{33}$ and $R^{34}$ each independently express hydrogen or a linear or branched alkyl group of 1 to 8 carbon atoms, and (a) when $R^{25}$ expresses hydrogen atom, D expresses a linear or branched, divalent hydrocarbon group of 2 to 30 carbon atoms, or a formula (VI) or (VII):

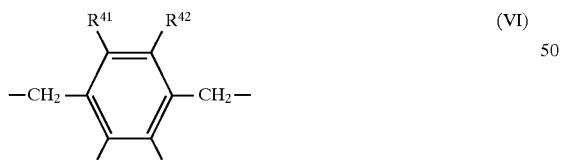

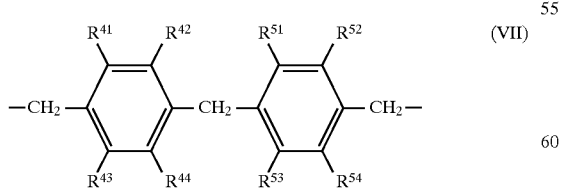

and $R^{41}, R^{42}, R^{43}, R^{44}, R^{51}, R^{52}, R^{53}$ and $R^{54}$ each independently express hydrogen or a linear or branched alkyl group of 1 to 8 carbon atoms, and (b) when $R^{25}$ expresses a linear or branched alkyl group of 1 to 12 carbon atoms, D expresses direct bond, an aliphatic group of 1 to 30 carbon atoms, an aromatic group of 6 to 30 carbon atoms or a hydrocarbon group having both of at least one aliphatic group and at least one aromatic group of 7 to 30 carbon atoms, but excluding a case where $R^{25}$ represents methyl group, D represents propan-2-ylidene group and $R^{11}, R^{12}, R^{13}, R^{14}, R^{21}, R^{22}, R^{23}, R^{24}, R^{31}, R^{32}, R^{33}$ and $R^{34}$, all represent hydrogen atom, and in the formula (V), $R^{100}$ independently expresses the same or different alkyl groups of 1 to 3 carbon atoms or phenyl groups, and b, c and d express 0 or a positive number and have a value of $1 \leq b+c+d \leq 100$.

(2) A polyamic acid consisting of structural units expressed by the following formulas (I) and (II):

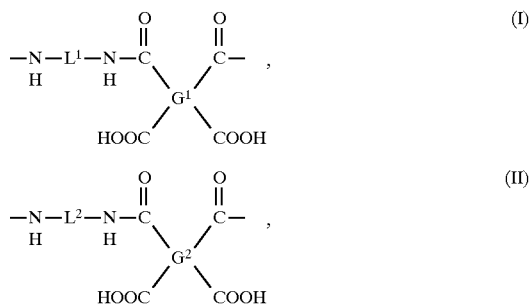

the structural unit expressed by the formula (I) being 50 to 100% by mol, and the molecular terminal being an amino group, an acid anhydride group or a carboxyl group obtained by hydrating the acid anhydride group or a group expressed by the formula (III):

said polyamic acid having a logarithmic viscosity number of 0.1 to 5 dl/g as measured in N-methyl-2-pyrrolidone, in a concentration of 0.5 g/dl and at a temperature of 30° C.±0.01° C.

Wherein in the formulas (I) and (II), $G^1$ and $G^2$ each represent the same or different tetravalent organic groups of 4 to 30 carbon atoms, including at least one of an aromatic group and an alicyclic group; $L^1$ is expressed by the formula (IV),

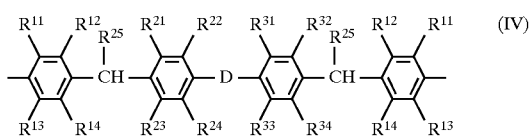

and $L^2$ is represented by a divalent aliphatic group of 2 to 12 carbon atoms or a divalent organic group of 4 to 36 carbon atoms, different from $L^1$, the organic group including one member or more of an aromatic group or an alicyclic group, or a polysiloxane group expressed by the formula (V):

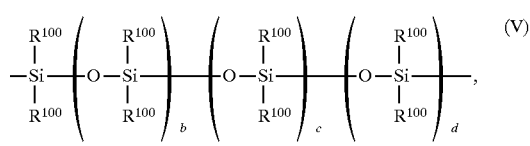

in the formula (III), Z expresses an alkylene group of 2 to 10 carbon atoms or a phenylene group; $R^{45}$ expresses an alkyl group or an alkenyl group of 1 to 10 carbon atoms or a phenyl group; $R^{46}$ expresses an alkyl group, an alkenyl group or an alkoxyalkyl group of 1 to 10 carbon atoms or a phenyl group; and m expresses an integer of 1 to 3, in the formula (IV), $R^{11}$, $R^{12}$, $R^{13}$, $R^{14}$, $R^{21}$, $R^{22}$, $R^{23}$, $R^{24}$, $R^{25}$, $R^{31}$, $R^{32}$, $R^{33}$ and $R^{34}$ each independently express hydrogen or a linear or branched alkyl group of 1 to 8 carbon atoms, and (a) when $R^{25}$ expresses hydrogen atom, D expresses a linear or branched divalent hydrocarbon group of 2 to 30 carbon atoms, or a formula (VI) or (VII):

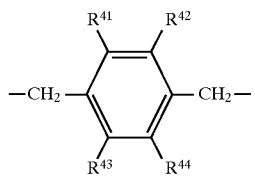

(VI)

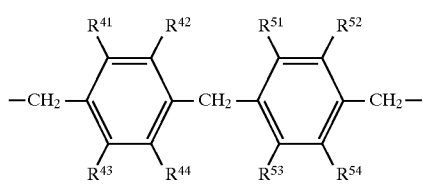

(VII)

and $R^{41}$, $R^{42}$, $R^{43}$, $R^{44}$, $R^{51}$, $R^{52}$, $R^{53}$ and $R^{54}$ each independently represent hydrogen or a linear or branched alkyl group of 1 to 8 carbon atoms, and (b) when $R^{25}$ expresses a linear or branched alkyl group of 1 to 12 carbon atoms, D expresses direct bond, an aliphatic group of 1 to 30 carbon atoms, an aromatic group of 6 to 30 carbon atoms or a hydrocarbon group having both of at least one aliphatic group and at least one aromatic group of 7 to 30 carbon atoms, but excluding a case where $R^{25}$ represents methyl group, D represents propane-2-ylidene group and $R^{11}$, $R^{12}$, $R^{13}$, $R^{14}$, $R^{21}$, $R^{22}$, $R^{23}$, $R^{24}$, $R^{31}$, $R^{32}$, $R^{33}$ and $R^{34}$ all represent hydrogen atom, and in the formula (V), $R^{100}$ independently expresses the same or different alkyl groups of 1 to 3 carbon atoms or phenyl groups, and b, c and d express 0 or a positive number and have a value of $1 \leq b+c+d \leq 100$.

(3) A polyimide film according to item 1, wherein in the formula (IV),

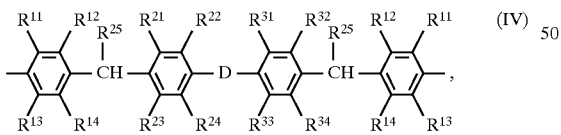

(IV)

all of $R^{11}$, $R^{12}$, $R^{13}$, $R^{14}$, $R^{21}$, $R^{22}$, $R^{23}$, $R^{24}$, $R^{25}$, $R^{31}$, $R^{32}$, $R^{33}$ and $R^{34}$ express hydrogen atom and D expresses a formula,

(VIII)

(4) A polyimide film according to item 1, wherein in the formula (IV), all of $R^{11}$, $R^{12}$, $R^{13}$, $R^{14}$, $R^{21}$, $R^{22}$, $R^{23}$, $R^{24}$, $R^{25}$, $R^{31}$, $R^{32}$, $R^{33}$ and $R^{34}$ express hydrogen atom and D expresses a formula (IX)

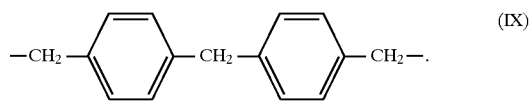

(IX)

(5) A polyimide film according to item 1, wherein, in the formula (IV), $R^{25}$ represents hydrogen atom and D represents a group expressed by the following formula (X):

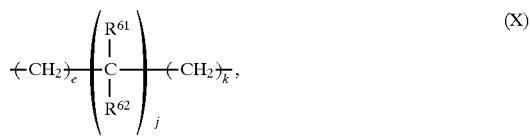

(X)

$R^{11}$, $R^{12}$, $R^{13}$ and $R^{14}$ independently express hydrogen atom or a linear or branched alkyl group of 1 to 8 carbon atoms, and $R^{21}$ and $R^{32}$; $R^{22}$ and $R^{31}$; $R^{23}$ and $R^{34}$; and $R^{24}$ and $R^{33}$, are the same atoms or groups, and the atoms or the groups of the respective sets each independently express hydrogen atom or a linear or branched alkyl group of 1 to 8 carbon atoms, and in the above formula (X), $R^{61}$ expresses hydrogen atom or a linear or branched alkyl group of 1 to 12 carbon atoms; $R^{62}$ represents a linear or branched alkyl group of 1 to 12 carbon atoms; e and k each independently express 0 to 10, and j expresses 0 to 20, and when j is 0, the sum of e and k is 2 or more, and when j is one or more, the sum of e and k is 0 or more.

(6) A polyimide film according to item 1, wherein, in the formula (IV), $R^{25}$ represents a linear or branched alkyl group of 1 to 12 carbon atoms; D represents either one of groups expressed by

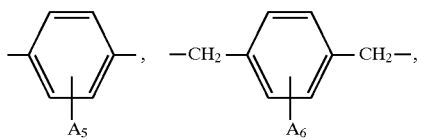

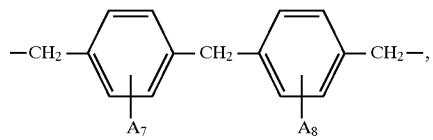

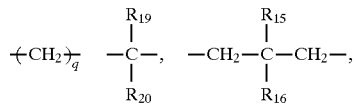

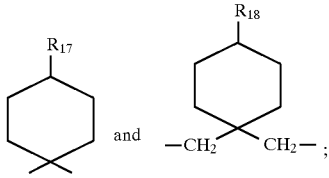

$R^{11}$, $R^{12}$, $R^{13}$ and $R^{14}$ each independently represent hydrogen atom or a linear or branched alkyl group of 1 to 8 carbon atoms; $R^{21}$ and $R^{32}$, $R^{22}$ and $R^{31}$, $R^{23}$ and $R^{34}$ and $R^{24}$ and $R^{33}$, are each the same atom or group; and the atoms or groups of the respective sets each independently represent hydrogen atom or a linear or branched alkyl group of 1 to 8 carbon atoms, in the above formulas, $A_5$, $A_6$, $A_7$ and $A_8$ each independently represent hydrogen atom or a linear or branched alkyl group of 1 to 8 carbon atoms; q represents an integer of 0 or more; $R_{15}$, $R_{16}$, $R_{19}$ and $R_{20}$ each independently represent hydrogen or a linear or branched alkyl group of 1 to 20 carbon atoms; and $R_{17}$ and $R_{18}$ each independently represent hydrogen atom or a linear or branched alkyl group of 1 to 8 carbon atoms, but excluding a case where $R^{25}$ represents methyl group, D represents propan-2-ylidene group, and $R^{11}$, $R^{12}$, $R^{13}$, $R^{14}$, $R^{21}$, $R^{22}$, $R^{23}$, $R^{24}$, $R^{31}$, $R^{32}$, $R^{33}$ and $R^{34}$ all represent hydrogen atom.

(7) A polyimide film according to item 1, wherein, in the formula (IV), $R^{11}$, $R^{12}$, $R^{13}$, $R^{14}$, $R^{21}$, $R^{22}$, $R^{23}$, $R^{24}$, $R^{25}$, $R^{31}$, $R^{32}$, $R^{33}$ and $R^{34}$ all represent hydrogen atom and D is represented by the formula (X):

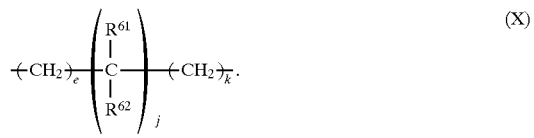

wherein $R^{61}$ expresses hydrogen atom or a linear or branched alkyl group of 1 to 12 carbon atoms; $R^{62}$ represents a linear or branched alkyl group of 1 to 12 carbon atoms; e and k each independently express 0 to 10, and j expresses 0 to 20, and when j is 0, the sum of e and k is 2 or more, and when j is one or more, the sum of e and k is 0 or more.

(8) A polyimide film according to item 1, wherein, in the formula (IV), $R^{11}$, $R^{12}$, $R^{13}$, $R^{14}$, $R^{21}$, $R^{22}$, $R^{23}$, $R^{24}$, $R^{25}$, $R^{31}$, $R^{32}$, $R^{33}$ and $R^{34}$ all represent hydrogen atom, and D is a group represented by the formula (X):

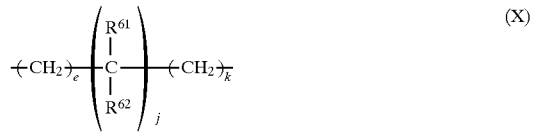

wherein j represents 0, and the sum of e and k is 2 to 10.

(9) A polyimide film according to item 1, wherein, in the formula (IV):

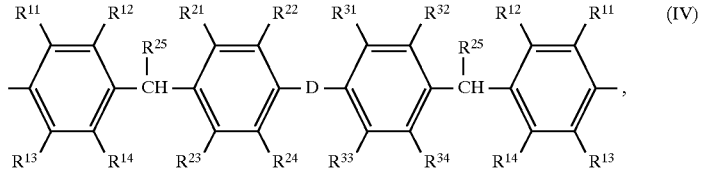

$R^{11}$, $R^{12}$, $R^{13}$, $R^{14}$, $R^{21}$, $R^{22}$, $R^{23}$, $R^{24}$, $R^{25}$, $R^{31}$, $R^{32}$, $R^{33}$ and $R^{34}$ all represent hydrogen atom, and D is a group represented by the formula (X):

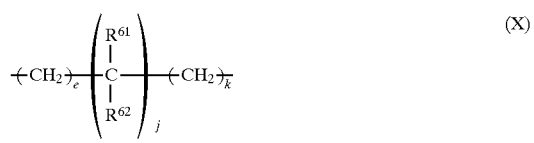

wherein $R^{61}$ represents hydrogen atom, $R^{62}$ represents a linear alkyl group of 1 to 10 carbon atoms, and e, j and k all represent 1.

(10) A polyimide film according to item 1, wherein, in the formula (IV), $R^{11}$, $R^{12}$, $R^{13}$, $R^{14}$, $R^{21}$, $R^{22}$, $R^{23}$, $R^{24}$, $R^{25}$, $R^{31}$, $R^{32}$, $R^{33}$ and $R^{34}$ all represent hydrogen atom, and D is a group represented by the formula (X):

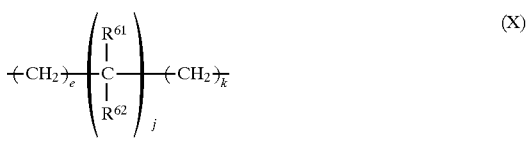

wherein $R^{61}$ represents hydrogen atom, $R^{62}$ represents a linear alkyl group of 1 to 10 carbon atoms, e and k each represent 0 and j represents 1.

(11) A polyimide film according to item 1, wherein in the formula (IV), $R^{25}$ represents a linear alkyl group of 1 to 6 carbon atoms, $R^{11}$, $R^{12}$, $R^{13}$, $R^{14}$, $R^{21}$, $R^{22}$, $R^{23}$, $R^{24}$, $R^{31}$, $R^{32}$, $R^{33}$ and $R^{34}$ all represent hydrogen atom and D represents methylene group.

(12) A polyimide film according to item 1, wherein, in the formula (IV), $R^{25}$ represents a linear alkyl group of 1 to 6 carbon atoms, $R^{11}$, $R^{12}$, $R^{13}$, $R^{14}$, $R^{21}$, $R^{22}$, $R^{23}$, $R^{24}$, $R^{31}$, $R^{32}$, $R^{33}$ and $R^{34}$ all represent hydrogen atom, D represents cyclohexylene group or 4-alkylcyclohexylene group, and the alkyl therein represents an alkyl group of 1 to 4 carbon atoms.

(13) A liquid crystal aligning film composed of a polyimide film according to either one of item (1) or items (3) to (12).

(14) A liquid crystal display element provided with a first substrate having a display picture element electrode formed thereon; a second substrate having an opposed electrode formed at least within a range opposed to said display picture element electrode; an aligning film having an aligning film according to said item (13) formed on the surfaces of said first and second substrates; and a liquid crystal composition placed between spaces kept so as to have a definite distance.

(15) A liquid crystal display element according to item 14, wherein said liquid crystal composition contains at least one compound selected from a group consisting of compounds expressed by the following formulas (XI), (XII), (XIII) and (XIV):

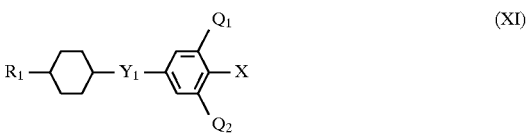

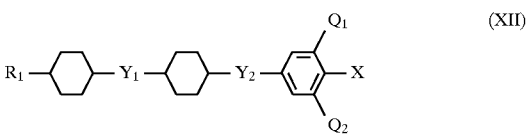

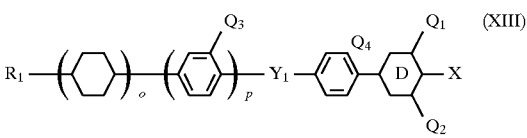

-continued

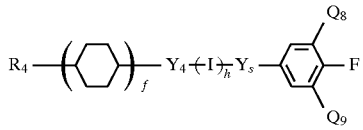 (XIV)

wherein R₁ represents an alkyl group of 1 to 10 carbon atoms; X represents F, Cl, CF₃, OCF₃, OCF₂H or an alkyl group of 1 to 10 carbon atoms; $Q_1$, $Q_2$, $Q_3$ and $Q_4$ each independently represent H or F; o represents 1 or 2; p represents 0 or 1; $Y_1$ and $Y_2$ each independently represent —CH₂CH₂—, —CH=CH— or direct bond; ring D represents trans-1,4-cyclohexylene group or 1,4-phenylene group; R₄ represents an alkyl group of 1 to 10 carbon atoms; I represents trans-1,4-cyclohexylene group or 1,4-phenylene group; $Q_8$ and $Q_9$ each independently represent H or F; $Y_4$ represents —COO— or direct bond; $Y_5$ represents —COO— or —C≡C—; and f and h each independently represent 0 or 1.

(16) A liquid crystal display element according to item 14, wherein the liquid crystal composition contains one or more liquid crystalline compounds selected from the group consisting of those expressed by the formulas (XI), (XII), (XIII) and (XIV), and contains as other component(s), one or more liquid crystalline compounds selected from the group consisting of those expressed by the formulas (XV) and (XVI):

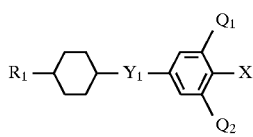 (XI)

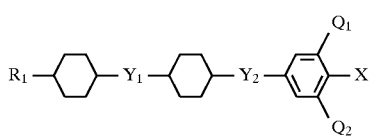 (XII)

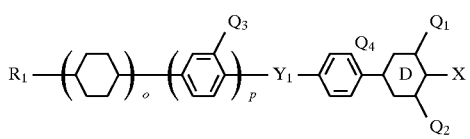 (XIII)

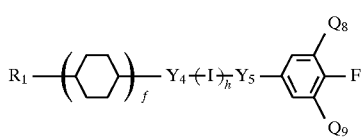 (XIV)

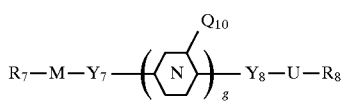 (XV)

(XVI)

in the formulas (XV) and (XVI), R₅ and R₆ each independently represent an alkyl group, an alkoxy group or an alkoxymethyl group of 1 to 10 carbon atoms; J represents trans-1,4-cyclohexylene group, 1,3-pyrimidine-2,5-diyl group or 1,4-phenylene group, K represents trans-1,4-cyclohexylene group or 1,4-phenylene group; Y6 represents —C≡C—, —COO—, —CH₂=CH₂— or direct bond, R₇ represents an alkyl group or an alkoxy group of 1 to 10 carbon atoms; R₈ represents an alkyl group of 1 to 10 carbon atoms and an optional methylene group (—CH₂—) in R₈ may be replaced by oxygen atom (—O—), but two or more methylene groups are not continuously replaced by oxygen atom; M represents trans-1,4-cyclohexylene group or 1,3-pyrimidine-2,5-diyl group; rings N and U each independently represent trans-1,4-cyclohexylene group or 1,4-phenylene group; $Y_7$ represents —CH₂CH₂—, —COO— or direct bond; $Y_8$ represents —C≡C—, —COO— or direct bond; g represents 0 or 1; and $Q_{10}$ represents H or F.

The diamino compounds having a core structure expressed by the formula (IV), used for the polyamic acid, polyimide film, liquid crystal aligning film and liquid crystal display element of the present invention, are those having no polar atom such as —O—, —SO₂—, and by increasing the molecular weight of the amine, relatively reducing the proportion of imide group, and reducing the proportion of the polar component as small as possible.

Concrete examples are illustrated below:
1,2-bis(4-(4-aminobenzyl)phenyl)ethane
1,3-bis(4-(4-aminobenzyl)phenyl)propane
1,4-bis(4-(4-aminobenzyl)phenyl)butane
1,5-bis(4-(4-aminobenzyl)phenyl)pentane
1,6-bis(4-(4-aminobenzyl)phenyl)hexane
1,7-bis(4-(4-aminobenzyl)phenyl)heptane
1,8-bis(4-(4-aminobenzyl)phenyl)octane
1,9-bis(4-(4-aminobenzyl)phenyl)nonane
1,10-bis(4-(4-aminobenzyl)phenyl)decane
1,11-bis(4-(4-aminobenzyl)phenyl)undecane
1,12-bis(4-(4-aminobenzyl)phenyl)dodecane
1,13-bis(4-(4-aminobenzyl)phenyl)tridecane
1,14-bis(4-(4-aminobenzyl)phenyl)tetradecane
1,15-bis(4-(4-aminobenzyl)phenyl)pentadecane
1,16-bis(4-(4-aminobenzyl)phenyl)hexadecane
1,17-bis(4-(4-aminobenzyl)phenyl)heptadecane
1,18-bis(4-(4-aminobenzyl)phenyl)octadecane
1,19-bis(4-(4-aminobenzyl)phenyl)nonadecane
1,20-bis(4-(4-aminobenzyl)phenyl)eicosane
1,2-bis(2-methyl-4-(4-aminobenzyl)phenyl)ethane
1,3-bis(2-methyl-4-(4-aminobenzyl)phenyl)propane
1,4-bis(2-methyl-4-(4-aminobenzyl)phenyl)butane
1,5-bis(2-methyl-4-(4-aminobenzyl)phenyl)pentane
1,6-bis(2-methyl-4-(4-aminobenzyl)phenyl)hexane
1,7-bis(2-methyl-4-(4-aminobenzyl)phenyl)heptane
1,8-bis(2-methyl-4-(4-aminobenzyl)phenyl)octane
1,9-bis(2-methyl-4-(4-aminobenzyl)phenyl)nonane
1,10-bis(2-methyl-4-(4-aminobenzyl)phenyl)decane
1,11-bis(2-methyl-4-(4-aminobenzyl)phenyl)undecane
1,12-bis(2-methyl-4-(4-aminobenzyl)phenyl)dodecane
1,13-bis(2-methyl-4-(4-aminobenzyl)phenyl)tridecane
1,14-bis(2-methyl-4-(4-aminobenzyl)phenyl)tetradecane
1,15-bis(2-methyl-4-(4-aminobenzyl)phenyl)pentadecane
1,16-bis(2-methyl-4-(4-aminobenzyl)phenyl)hexadecane
1,17-bis(2-methyl-4-(4-aminobenzyl)phenyl)heptadecane
1,18-bis(2-methyl-4-(4-aminobenzyl)phenyl)octadecane
1,19-bis(2-methyl-4-(4-aminobenzyl)phenyl)nonadecane
1,20-bis(2-methyl-4-(4-aminobenzyl)phenyl)eicosane
1,2-bis(4-(2-methyl-4-aminobenzyl)phenyl)ethane
1,3-bis(4-(2-methyl-4-aminobenzyl)phenyl)propane
1,4-bis(4-(2-methyl-4-aminobenzyl)phenyl)butane
1,5-bis(4-(2-methyl-4-aminobenzyl)phenyl)pentane
1,6-bis(4-(2-methyl-4-aminobenzyl)phenyl)hexane
1,7-bis(4-(2-methyl-4-aminobenzyl)phenyl)heptane
1,8-bis(4-(2-methyl-4-aminobenzyl)phenyl)octane
1,9-bis(4-(2-methyl-4-aminobenzyl)phenyl)nonane
1,10-bis(4-(2-methyl-4-aminobenzyl)phenyl)decane
1,11-bis(4-(2-methyl-4-aminobenzyl)phenyl)undecane
1,12-bis(4-(2-methyl-4-aminobenzyl)phenyl)dodecane
1,13-bis(4-(2-methyl-4-aminobenzyl)phenyl)tridecane
1,14-bis(4-(2-methyl-4-aminobenzyl)phenyl)tetradecane
1,15-bis(4-(2-methyl-4-aminobenzyl)phenyl)pentadecane
1,16-bis(4-(2-methyl-4-aminobenzyl)phenyl)hexadecane
1,17-bis(4-(2-methyl-4-aminobenzyl)phenyl)heptadecane 1,18-bis(4-(2-methyl-4-aminobenzyl)phenyl)octadecane
1,19-bis(4-(2-methyl-4-aminobenzyl)phenyl)nonadecane
1,20-bis(4-(2-methyl-4-aminobenzyl)phenyl)eicosane
1,2-bis(4-(3-methyl-4-aminobenzyl)phenyl)ethane
1,2-bis(4-(3-ethyl-4-aminobenzyl)phenyl)ethane
1,2-bis(4-(3-propyl-4-aminobenzyl)phenyl)ethane
1,2-bis(4-(3-butyl-4-aminobenzyl)phenyl)ethane
1,2-bis(4-(3-pentyl-4-aminobenzyl)phenyl)ethane
1,2-bis(4-(3-hexyl-4-aminobenzyl)phenyl)ethane
1,2-bis(4-(3-heptyl-4-aminobenzyl)phenyl)ethane
1,2-bis(4-(3-octyl-4-aminobenzyl)phenyl)ethane
1,1-bis(4-(4-aminobenzyl)phenyl)ethane
1,1-bis(4-(4-aminobenzyl)phenyl)propane
1,1-bis(4-(4-aminobenzyl)phenyl)butane
1,1-bis(4-(4-aminobenzyl)phenyl)pentane
1,1-bis(4-(4-aminobenzyl)phenyl)hexane
1,1-bis(4-(4-aminobenzyl)phenyl)heptane
1,1-bis(4-(4-aminobenzyl)phenyl)octane
1,1-bis(4-(4-aminobenzyl)phenyl)nonane
1,1-bis(4-(4-aminobenzyl)phenyl)decane
1,1-bis(4-(4-aminobenzyl)phenyl)undecane
1,1-bis(4-(4-aminobenzyl)phenyl)dodecane
1,1-bis(4-(2-methyl-4-aminobenzyl)phenyl)ethane
1,1-bis(4-(2-methyl-4-aminobenzyl)phenyl)propane
1,1-bis(4-(2-methyl-4-aminobenzyl)phenyl)butane
1,1-bis(4-(2-methyl-4-aminobenzyl)phenyl)pentane
1,1-bis(4-(2-methyl-4-aminobenzyl)phenyl)hexane
1,1-bis(4-(2-methyl-4-aminobenzyl)phenyl)heptane
1,1-bis(4-(2-methyl-4-aminobenzyl)phenyl)octane
1,1-bis(4-(2-methyl-4-aminobenzyl)phenyl)nonane
1,1-bis(4-(2-methyl-4-aminobenzyl)phenyl)decane
1,1-bis(4-(2-methyl-4-aminobenzyl)phenyl)undecane
1,1-bis(4-(2-methyl-4-aminobenzyl)phenyl)dodecane
1,3-bis(4-(4-aminobenzyl)phenyl)-2-methylpropane
1,3-bis(4-(4-aminobenzyl)phenyl)-2-ethylpropane
1,3-bis(4-(4-aminobenzyl)phenyl)-2-propylpropane
1,3-bis(4-(4-aminobenzyl)phenyl)-2-butylpropane
1,3-bis(4-(4-aminobenzyl)phenyl)-2-pentylpropane
1,3-bis(4-(4-aminobenzyl)phenyl)-2-hexylpropane
1,3-bis(4-(4-aminobenzyl)phenyl)-2-heptylpropane
1,3-bis(4-(4-aminobenzyl)phenyl)-2-octylpropane
1,3-bis(4-(4-aminobenzyl)phenyl)-2-nonypropane
1,3-bis(4-(4-aminobenzyl)phenyl)-2-decylpropane
1,3-bis(4-(4-aminobenzyl)phenyl)-2-undecylpropane
1,3-bis(4-(4-aminobenzyl)phenyl)-2-dodecylpropane
1,3-bis(4-(2-methyl-4-aminobenzyl)phenyl)-2-methylpropane
1,3-bis(4-(2-methyl-4-aminobenzyl)phenyl)-2-ethylpropane
1,3-bis(4-(2-methyl-4-aminobenzyl)phenyl)-2-propylpropane
1,3-bis(4-(2-methyl-4-aminobenzyl)phenyl)-2-butylpropane
1,3-bis(4-(2-methyl-4-aminobenzyl)phenyl)-2-pentylpropane
1,3-bis(4-(2-methyl-4-aminobenzyl)phenyl)-2-hexylpropane
1,3-bis(4-(2-methyl-4-aminobenzyl)phenyl)-2-heptylpropane
1,3-bis(4-(2-methyl-4-aminobenzyl)phenyl)-2-octylpropane
1,3-bis(4-(2-methyl-4-aminobenzyl)phenyl)-2-nonylpropane
1,3-bis(4-(2-methyl-4-aminobenzyl)phenyl)-2-decylpropane
1,3-bis(4-(2-methyl-4-aminobenzyl)phenyl)-2-undecylpropane
1,3-bis(4-(2-methyl-4-aminobenzyl)phenyl)-2-dodecylpropane
1,5-bis(4-(4-aminobenzyl)phenyl)-3-methylpentane
1,5-bis(4-(4-aminobenzyl)phenyl)-3-ethylpentane
1,5-bis(4-(4-aminobenzyl)phenyl)-3-propylpentane
1,5-bis(4-(4-aminobenzyl)phenyl)-3-butylpentane
1,5-bis(4-(4-aminobenzyl)phenyl)-3-pentylpentane
1,5-bis(4-(4-aminobenzyl)phenyl)-3-hexylpentane
1,5-bis(4-(4-aminobenzyl)phenyl)-3-heptylpentane
1,5-bis(4-(4-aminobenzyl)phenyl)-3-octylpentane
2,2-bis(4-(4-aminobenzyl)phenyl)-propane
2,2-bis(4-(4-aminobenzyl)phenyl)-butane
2,2-bis(4-(4-aminobenzyl)phenyl)-pentane
2,2-bis(4-(4-aminobenzyl)phenyl)-hexane
2,2-bis(4-(4-aminobenzyl)phenyl)-heptane
2,2-bis(4-(4-aminobenzyl)phenyl)-octane
2,2-bis(4-(4-aminobenzyl)phenyl)-nonane
2,2-bis(4-(4-aminobenzyl)phenyl)-decane
2,2-bis(4-(4-aminobenzyl)phenyl)-undecane
2,2-bis(4-(4-aminobenzyl)phenyl)-dodecane
2,2-bis(4-(4-aminobenzyl)phenyl)-tridecane
2,2-bis(4-(4-aminobenzyl)phenyl)-tetradecane
bis(4-(1-(4-aminophenyl)ethyl)phenyl)methane
bis(4-(1-(4-aminophenyl)propyl)phenyl)methane
bis(4-(1-(4-aminophenyl)butyl)phenyl)methane
bis(4-(1-(4-aminophenyl)pentyl)phenyl)methane
bis(4-(1-(4-aminophenyl)hexyl)phenyl)methane
bis(4-(1-(4-aminophenyl)heptyl)phenyl)methane
bis(4-(1-(4-aminophenyl)nonyl)phenyl)methane
bis(4-(1-(4-aminophenyl)decyl)phenyl)methane
bis(4-(1-(4-aminophenyl)undecyl)phenyl)methane
bis(4-(1-(4-aminophenyl)dodecyl)phenyl)methane
bis(4-(1-(4-aminophenyl)tridecyl)phenyl)methane
1,2-bis(1-(4-aminophenyl)ethyl)phenyl)ethane
1,2-bis(4-(1-(4-aminophenyl)propyl)phenyl)ethane
1,2-bis(4-(1-(4-aminophenyl)butyl)phenyl)ethane
1,2-bis(4-(1-(4-aminophenyl)pentyl)phenyl)ethane
1,2-bis(4-(1-(4-aminophenyl)hexyl)phenyl)ethane
1,2-bis(4-(1-(4-aminophenyl)heptyl)phenyl)ethane
1,2-bis(4-(1-(4-aminophenyl)nonyl)phenyl)ethane
1,2-bis(4-(1-(4-aminophenyl)decyl)phenyl)ethane
1,2-bis(4-(1-(4-aminophenyl)undecyl)phenyl)ethane
1,2-bis(4-(1-(4-aminophenyl)dodecyl)phenyl)ethane
1,2-bis(4-(1-(4-aminophenyl)tridecyl)phenyl)ethane
1,3-bis(4-(1-(4-aminophenyl)ethyl)phenyl)propane
1,3-bis(4-(1-(4-aminophenyl)propyl)phenyl)propane
1,3-bis(4-(1-(4-aminophenyl)butyl)phenyl)propane
1,3-bis(4-(1-(4-aminophenyl)pentyl)phenyl)propane
1,3-bis(4-(1-(4-aminophenyl)hexyl)phenyl)propane
1,3-bis(4-(1-(4-aminophenyl)heptyl)phenyl)propane
1,3-bis(4-(1-(4-aminophenyl)nonyl)phenyl)propane
1,3-bis(4-(1-(4-aminophenyl)decyl)phenyl)propane
1,3-bis(4-(1-(4-aminophenyl)undecyl)phenyl)propane
1,3-bis(4-(1-(4-aminophenyl)dodecyl)phenyl)propane
1,3-bis(4-(1-(4-aminophenyl)tridecyl)phenyl)propane
bis(4-(1-(2-methyl-4-aminophenyl)ethyl)phenyl)methane
bis(4-(1-(2-methyl-4-aminophenyl)propyl)phenyl)methane
bis(4-(1-(2-methyl-4-aminophenyl)butyl)phenyl)methane
bis(4-(1-(2-methyl-4-aminophenyl)pentyl)phenyl)methane
bis(4-(1-(2-methyl-4-aminophenyl)hexyl)phenyl)methane
bis(4-(1-(2-methyl-4-aminophenyl)heptyl)phenyl)methane
bis(4-(1-(2-methyl-4-aminophenyl)nonyl)phenyl)methane
bis(4-(1-(2-methyl-4-aminophenyl)decyl)phenyl)methane
bis(4-(1-(2-methyl-4-aminophenyl)undecyl)phenyl)methane
bis(4-(1-(2-methyl-4-aminophenyl)dodecyl)phenyl)methane
bis(4-(1-(2-methyl-4-aminophenyl)tridecyl)phenyl)methane
1,1-bis(4-(1-(4-aminophenyl)ethyl)phenyl)ethane 1,1-bis(4-(1-(4-aminophenyl)ethyl)phenyl)propane
1,1-bis(4-(1-(4-aminophenyl)ethyl)phenyl)butane
1,1-bis(4-(1-(4-aminophenyl)ethyl)phenyl)pentane
1,1-bis(4-(1-(4-aminophenyl)ethyl)phenyl)hexane
1,1-bis(4-(2-methyl-4-aminophenyl)ethyl)phenylethane
1,2-bis(4-(1-(4-aminophenyl)ethyl)phenyl)butane
1,2-bis(4-(1-(4-aminophenyl)propyl)phenyl)butane
1,2-bis(4-(1-(4-aminophenyl)butyl)phenyl)butane
1,2-bis(4-(1-(4-aminophenyl)pentyl)phenyl)butane
1,2-bis(4-(1-(4-aminophenyl)hexyl)phenyl)butane
1,2-bis(4-(1-(4-aminophenyl)heptyl)phenyl)butane
1,2-bis(4-(1-(4-aminophenyl)nonyl)phenyl)butane
1,2-bis(4-(1-(4-aminophenyl)decyl)phenyl)butane
1,2-bis(4-(1-(4-aminophenyl)undecyl)phenyl)butane
1,2-bis(4-(1-(4-aminophenyl)dodecyl)phenyl)butane
1,2-bis(4-(1-(4-aminophenyl)tridecyl)phenyl)butane
1,1-bis(4-(1-(4-aminophenyl)ethyl)benzyl)ethane
1,1-bis(4-(1-(4-aminophenyl)propyl)benzyl)ethane
1,1-bis(4-(1-(4-aminophenyl)butyl)benzyl)ethane
1,1-bis(4-(1-(4-aminophenyl)pentyl)benzyl)ethane
1,1-bis(4-(1-(4-aminophenyl)hexyl)benzyl)ethane
1,1-bis(4-(1-(4-aminophenyl)heptyl)benzyl)ethane
1,1-bis(4-(1-(4-aminophenyl)ethyl)benzyl)butane,
1,1-bis(4-(1-(4-aminophenyl)propyl)benzyl)butane
1,1-bis(4-(1-(4-aminophenyl)butyl)benzyl)butane
1,1-bis(4-(1-(4-aminophenyl)pentyl)benzyl)butane
1,1-bis(4-(1-(4-aminophenyl)hexyl)benzyl)butane
1,1-bis(4-(1-(4-aminophenyl)heptyl)benzyl)butane
1,1-bis(4-(1-(4-aminophenyl)ethyl)benzyl)heptane
1,1-bis(4-(1-(4-aminophenyl)propyl)benzyl)heptane
1,1-bis(4-(1-(4-aminophenyl)butyl)benzyl)heptane
1,1-bis(4-(1-(4-aminophenyl)pentyl)benzyl)heptane
1,1-bis(4-(1-(4-aminophenyl)hexyl)benzyl)heptane
1,1-bis(4-(1-(4-aminophenyl)heptyl)benzyl)heptane
1,1-bis(4-(1-(4-aminophenyl)ethyl)phenyl)cyclohexane
1,1-bis(4-(1-(4-aminophenyl)propyl)phenyl)cyclohexane
1,1-bis(4-(1-(4-aminophenyl)butyl)phenyl)cyclohexane
1,1-bis(4-(1-(4-aminophenyl)pentyl)phenyl)cyclohexane
1,1-bis(4-(1-(4-aminophenyl)hexyl)phenyl)cyclohexane
1,1-bis(4-(1-(4-aminophenyl)heptyl)phenyl)cyclohexane
1,1-bis(4-(1-(4-aminophenyl)nonyl)phenyl)cyclohexane
1,1-bis(4-(1-(4-aminophenyl)decyl)phenyl)cyclohexane
1,1-bis(4-(1-(4-aminophenyl)undecyl)phenyl)cyclohexane
1,1-bis(4-(1-(4-aminophenyl)dodecyl)phenyl)cyclohexane
1,1-bis(4-(1-(4-aminophenyl)tridecyl)phenyl)cyclohexane
1,1-bis(4-(1-(4-aminophenyl)ethyl)phenyl)-4-methylcyclohexane
1,1-bis(4-(1-(4-aminophenyl)propyl)phenyl)-4-methylcyclohexane
1,1-bis(4-(1-(4-aminophenyl)butyl)phenyl)-4-methylcyclohexane
1,1-bis(4-(1-(4-aminophenyl)pentyl)phenyl)-4-methylcyclohexane
1,1-bis(4-(1-(4-aminophenyl)hexyl)phenyl)-4-methylcyclohexane
1,1-bis(4-(1-(4-aminophenyl)heptyl)phenyl)-4-methylcyclohexane
1,1-bis(4-(1-(4-aminophenyl)ethyl)phenyl)-4-ethylcyclohexane
1,1-bis(4-(1-(4-aminophenyl)propyl)phenyl)-4-ethylcyclohexane
1,1-bis(4-(1-(4-aminophenyl)butyl)phenyl)-4-ethylcyclohexane
1,1-bis(4-(1-(4-aminophenyl)pentyl)phenyl)-4-ethylcyclohexane
1,1-bis(4-(1-(4-aminophenyl)hexyl)phenyl)-4-ethylcyclohexane
1,1-bis(4-(1-(4-aminophenyl)heptyl)phenyl)-4-ethylcyclohexane
1,1-bis(4-(1-(4-aminophenyl)ethyl)phenyl)-4-propylcyclohexane
1,1-bis(4-(1-(4-aminophenyl)propyl)phenyl)-4-propylcyclohexane
1,1-bis(4-(1-(4-aminophenyl)butyl)phenyl)-4-propylcyclohexane
1,1-bis(4-(1-(4-aminophenyl)pentyl)phenyl)-4-propylcyclohexane
1,1-bis(4-(1-(4-aminophenyl)hexyl)phenyl)-4-propylcyclohexane
1,1-bis(4-(1-(4-aminophenyl)heptyl)phenyl)-4-propylcyclohexane
1,1-bis(4-(1-(4-aminophenyl)ethyl)phenyl)-4-butylcyclohexane
1,1-bis(4-(1-(4-aminophenyl)propyl)phenyl)-4-butylcyclohexane
1,1-bis(4-(1-(4-aminophenyl)butyl)phenyl)-4-butylcyclohexane
1,1-bis(4-(1-(4-aminophenyl)pentyl)phenyl)-4-butylcyclohexane
1,1-bis(4-(1-(4-aminophenyl)hexyl)phenyl)-4-butylcyclohexane
1,1-bis(4-(1-(4-aminophenyl)heptyl)phenyl)-4-butylcyclohexane
1,1-bis(4-(1-(4-aminophenyl)ethyl)phenyl)-4-pentylcyclohexane
1,1-bis(4-(1-(4-aminophenyl)propyl)phenyl)-4-pentylcyclohexane
1,1-bis(4-(1-(4-aminophenyl)butyl)phenyl)-4-pentylcyclohexane
1,1-bis(4-(1-(4-aminophenyl)pentyl)phenyl)-4-pentylcyclohexane
1,1-bis(4-(1-(4-aminophenyl)hexyl)phenyl)-4-pentylcyclohexane
1,1-bis(4-(1-(4-aminophenyl)heptyl)phenyl)-4-pentylcyclohexane
1,1-bis(4-(1-(4-aminophenyl)ethyl)phenyl)-4-hexylcyclohexane
1,1-bis(4-(1-(4-aminophenyl)propyl)phenyl)-4-hexylcyclohexane
1,1-bis(4-(1-(4-aminophenyl)butyl)phenyl)-4-hexylcyclohexane
1,1-bis(4-(1-(4-aminophenyl)pentyl)phenyl)-4-hexylcyclohexane
1,1-bis(4-(1-(4-aminophenyl)hexyl)phenyl)-4-hexylcyclohexane
1,1-bis(4-(1-(4-aminophenyl)heptyl)phenyl)-4-hexylcyclohexane
1,1-bis(4-(1-(4-aminophenyl)ethyl)phenyl)-4-heptylcyclohexane
1,1-bis(4-(1-(4-aminophenyl)propyl)phenyl)-4-heptylcyclohexane
1,1-bis(4-(1-(4-aminophenyl)butyl)phenyl)-4-heptylcyclohexane
1,1-bis(4-(1-(4-aminophenyl)pentyl)phenyl)-4-heptylcyclohexane
1,1-bis(4-(1-(4-aminophenyl)hexyl)phenyl)-4-heptylcyclohexane
1,1-bis(4-(1-(4-aminophenyl)heptyl)phenyl)-4-heptylcyclohexane
1,1-bis(4-(1-(4-aminophenyl)ethyl)phenyl)-4-octylcyclohexane
1,1-bis(4-(1-(4-aminophenyl)propyl)phenyl)-4-octylcyclohexane
1,1-bis(4-(1-(4-aminophenyl)butyl)phenyl)-4-octylcyclohexane 1,1-bis(4-(1-(4-aminophenyl)pentyl)phenyl)-4-octylcyclohexane
1,1-bis(4-(1-(4-aminophenyl)hexyl)phenyl)-4-octylcyclohexane
1,1-bis(4-(1-(4-aminophenyl)heptyl)phenyl)-4-octylcyclohexane
1,1-bis(4-(1-(2-methyl-4-aminophenyl)ethyl)phenyl)cyclohexane
1,1-bis(4-(1-(2-methyl-4-aminophenyl)propyl)phenyl)cyclohexane
1,1-bis(4-(1-(2-methyl-4-aminophenyl)butyl)phenyl)cyclohexane
1,1-bis(4-(1-(2-methyl-4-aminophenyl)pentyl)phenyl)cyclohexane
1,1-bis(4-(1-(2-methyl-4-aminophenyl)hexyl)phenyl)cyclohexane
1,1-bis(4-(1-(2-methyl-4-aminophenyl)heptyl)phenyl)cyclohexane
1,1-bis(4-(1-(2-methyl-4-aminophenyl)nonyl)phenyl)cyclohexane
1,1-bis(4-(1-(2-methyl-4-aminophenyl)decyl)phenyl)cyclohexane
1,1-bis(4-(1-(2-methyl-4-aminophenyl)undecyl)phenyl)cyclohexane
1,1-bis(4-(1-(2-methyl-4-aminophenyl)dodecyl)phenyl)cyclohexane
1,1-bis(4-(1-(2-methyl-4-aminophenyl)tridecyl)phenyl)cyclohexane
1,4-bis(4-(1-(4-aminophenyl)ethyl)benzyl)benzene
1,4-bis(4-(1-(4-aminophenyl)propyl)benzyl)benzene
1,4-bis(4-(1-(4-aminophenyl)butyl)benzyl)benzene
1,4-bis(4-(1-(4-aminophenyl)pentyl)benzyl)benzene
1,4-bis(4-(1-(4-aminophenyl)hexyl)benzyl)benzene
1,4-bis(4-(1-(4-aminophenyl)heptyl)benzyl)benzene
1,4-bis(4-(1-(4-aminophenyl)nonyl)benzyl)benzene
1,4-bis(4-(1-(4-aminophenyl)decyl)benzyl)benzene
1,4-bis(4-(1-(4-aminophenyl)undecyl)benzyl)benzene
1,4-bis(4-(1-(4-aminophenyl)dodecyl)benzyl)benzene
1,4-bis(4-(1-(4-aminophenyl)tridecyl)benzyl)benzene
1,4-bis(4-(4-aminophenylmethyl)phenylmethyl)benzene
1,4-bis(2-methyl-4-(4-aminophenylmethyl)phenylmethyl)benzene
1,4-bis(2-ethyl-4-(4-aminophenylmethyl)phenylmethyl)benzene
1,4-bis(2-propyl-4-(4-aminophenylmethyl)phenylmethyl)benzene
1,4-bis(2-butyl-4-(4-aminophenylmethyl)phenylmethyl)benzene
1,4-bis(2-pentyl-4-(4-aminophenylmethyl)phenylmethyl)benzene
1,4-bis(2-hexyl-4-(4-aminophenylmethyl)phenylmethyl)benzene
1,4-bis(2-heptyl-4-(4-aminophenylmethyl)phenylmethyl)benzene
1,4-bis(2-octyl-4-(4-aminophenylmethyl)phenylmethyl)benzene
1,4-bis(4-(4-aminophenylmethyl)phenylmethyl)-2-methylbenzene
1,4-bis(4-(4-aminophenylmethyl)phenylmethyl)-2-ethylbenzene
1,4-bis(4-(4-aminophenylmethyl)phenylmethyl)-2-propylbenzene
1,4-bis(4-(4-aminophenylmethyl)phenylmethyl)-2-butylbenzene
1,4-bis(4-(4-aminophenylmethyl)phenylmethyl)-2-pentylbenzene
1,4-bis(4-(4-aminophenylmethyl)phenylmethyl)-2-hexylbenzene
1,4-bis(4-(4-aminophenylmethyl)phenylmethyl)-2-heptylbenzene
1,4-bis(4-(4-aminophenylmethyl)phenylmethyl)-2-octylbenzene
1,1-bis(4-(4-(4-aminophenylmethyl)phenylmethyl)phenyl)methane
1,1-bis(4-(2-methyl-4-(4-aminophenylmethyl)phenylmethyl)phenyl)methane
1,1-bis(4-(2-ethyl-4-(4-aminophenylmethyl)phenylmethyl)phenyl)methane
1,1-bis(4-(2-propyl-4-(4-aminophenylmethyl)phenylmethyl)phenyl)methane
1,1-bis(4-(2-butyl-4-(4-aminophenylmethyl)phenylmethyl)phenyl)methane
1,1-bis(4-(2-pentyl-4-(4-aminophenylmethyl)phenylmethyl)phenyl)methane
1,1-bis(4-(2-hexyl-4-(4-aminophenylmethyl)phenylmethyl)phenyl)methane
1,1-bis(4-(2-heptyl-4-(4-aminophenylmethyl)phenylmethyl)phenyl)methane
1,1-bis(4-(2-octyl-4-(4-aminophenylmethyl)phenylmethyl)phenyl)methane
1,1-bis(2-methyl-4-(4-(4-aminophenylmethyl)phenylmethyl)phenyl)methane
1,1-bis(2-ethyl-4-(4-(4-aminophenylmethyl)phenylmethyl)phenyl)methane
1,1-bis(2-propyl-4-(4-(4-aminophenylmethyl)phenylmethyl)phenyl)methane
1,1-bis(2-butyl-4-(4-(4-aminophenylmethyl)phenylmethyl)phenyl)methane
1,1-bis(2-pentyl-4-(4-(4-aminophenylmethyl)phenylmethyl)phenyl)methane
1,1-bis(2-hexyl-4-(4-(4-aminophenylmethyl)phenylmethyl)phenyl)methane
1,1-bis(2-heptyl-4-(4-(4-aminophenylmethyl)phenylmethyl)phenyl)methane
1,1-bis(2-octyl-4-(4-(4-aminophenylmethyl)phenylmethyl)phenyl)methane Concrete examples of preferable compounds among the foregoing are as follows:
1,2-bis(4-(4-aminobenzyl)phenyl)ethane
1,3-bi-(4-(4-aminobenzyl)phenyl)propane
1,4-bis(4-(4-aminobenzyl)phenyl)butane
1,5-bis(4-(4-aminobenzyl)phenyl)pentane
1,6-bis(4-(4-aminobenzyl)phenyl)hexane
1,7-bis(4-(4-aminobenzyl)phenyl)heptane
1,8-bis(4-(4-aminobenzyl)phenyl)octane
1,9-bis(4-(4-aminobenzyl)phenyl)nonane
1,10-bis(4-(4-aminobenzyl)phenyl)decane
1,11-bis(4-(4-aminobenzyl)phenyl)undecane
1,12-bis(4-(4-aminobenzyl)phenyl)dodecane
1,13-bis(4-(4-aminobenzyl)phenyl)tridecane
1,14-bis(4-(4-aminobenzyl)phenyl)tetradecane
1,15-bis(4-(4-aminobenzyl)phenyl)pentadecane
1,16-bis(4-(4-aminobenzyl)phenyl)hexadecane
1,17-bis(4-(4-aminobenzyl)phenyl)heptadecane
1,18-bis(4-(4-aminobenzyl)phenyl)octadecane
1,19-bis(4-(4-aminobenzyl)phenyl)nonadecane
1,20-bis(4-(4-aminobenzyl)phenyl)eicosane
1,3-bis(4-(4-aminobenzyl)phenyl)-2-methylpropane
1,3-bis(4-(4-aminobenzyl)phenyl)-2-ethylpropane
1,3-bis(4-(4-aminobenzyl)phenyl)-2-propylpropane
1,3-bis(4-(4-aminobenzyl)phenyl)-2-butylpropane
1,3-bis(4-(4-aminobenzyl)phenyl)-2-pentylpropane
1,3-bis(4-(4-aminobenzyl)phenyl)-2-hexylpropane
1,3-bis(4-(4-aminobenzyl)phenyl)-2-heptylpropane
1,3-bis(4-(4-aminobenzyl)phenyl)-2-octylpropane 1,3-bis(4-(4-aminobenzyl)phenyl)-2-nonylpropane
1,3-bis(4-(4-aminobenzyl)phenyl)-2-decylpropane
1,3-bis(4-(4-aminobenzyl)phenyl)-2-undecylpropane
1,3-bis(4-(4-aminobenzyl)phenyl)-2-dodecylpropane
1,1-bis(4-(4-aminobenzyl)phenyl)ethane
1,1-bis(4-(4-aminobenzyl)phenyl)propane
1,1-bis(4-(4-aminobenzyl)phenyl)butane
1,1-bis(4-(4-aminobenzyl)phenyl)pentane
1,1-bis(4-(4-aminobenzyl)phenyl)hexane
1,1-bis(4-(4-aminobenzyl)phenyl)heptane
1,1-bis(4-(4-aminobenzyl)phenyl)octane
1,1-bis(4-(4-aminobenzyl)phenyl)nonane
1,1-bis(4-(4-aminobenzyl)phenyl)decane
1,1-bis(4-(4-aminobenzyl)phenyl)undecane
1,1-bis(4-(4-aminobenzyl)phenyl)dodecane
bis(4-(1-(4-aminophenyl)ethyl)phenyl)methane
bis(4-(1-(4-aminophenyl)propyl)phenyl)methane
bis(4-(1-(4-aminophenyl)butyl)phenyl)methane
bis(4-(1-(4-aminophenyl)pentyl)phenyl)methane
bis(4-(1-(4-aminophenyl)hexyl)phenyl)methane
bis(4-(1-(4-aminophenyl)heptyl)phenyl)methane
bis(4-(1-(4-aminophenyl)nonyl)phenyl)methane
bis(4-(1-(4-aminophenyl)decyl)phenyl)methane
bis(4-(1-(4-aminophenyl)undecyl)phenyl)methane
bis(4-(1-(4-aminophenyl)dodecyl)phenyl)methane
bis(4-(1-(4-aminophenyl)tridecyl)phenyl)methane
1,1-bis(4-(1-(4-aminophenyl)ethyl)phenyl)cyclohexane
1,1-bis(4-(1-(4-aminophenyl)propyl)phenyl)cyclohexane
1,1-bis(4-(1-(4-aminophenyl)butyl)phenyl)cyclohexane
1,1-bis(4-(1-(4-aminophenyl)pentyl)phenyl)cyclohexane
1,1-bis(4-(1-(4-aminophenyl)hexyl)phenyl)cyclohexane
1,1-bis(4-(1-(4-aminophenyl)heptyl)phenyl)cyclohexane
1,1-bis(4-(1-(4-aminophenyl)nonyl)phenyl)cyclohexane
1,1-bis(4-(1-(4-aminophenyl)decyl)phenyl)cyclohexane
1,1-bis(4-(1-(4-aminophenyl)undecyl)phenyl)cyclohexane
1,1-bis(4-(1-(4-aminophenyl)dodecyl)phenyl)cyclohexane
1,1-bis(4-(1-(4-aminophenyl)tridecyl)phenyl)cyclohexane
1,1-bis(4-(1-(4-aminophenyl)ethyl)phenyl)-4-butylcyclohexane
1,1-bis(4-(1-(4-aminophenyl)propyl)phenyl)-4-butylcyclohexane
1,1-bis(4-(1-(4-aminophenyl)butyl)phenyl)-4-butylcyclohexane
1,1-bis(4-(1-(4-aminophenyl)pentyl)phenyl)-4-butylcyclohexane
1,1-bis(4-(1-(4-aminophenyl)hexyl)phenyl)-4-butylcyclohexane
1,1-bis(4-(1-(4-aminophenyl)heptyl)phenyl)-4-butylcyclohexane
1,1-bis(4-(1-(4-aminophenyl)nonyl)phenyl)-4-butylcyclohexane
1,1-bis(4-(1-(4-aminophenyl)decyl)phenyl)-4-butylcyclohexane
1,1-bis(4-(1-(4-aminophenyl)undecyl)phenyl)-4-butylcyclohexane
1,1-bis(4-(1-(4-aminophenyl)dodecyl)phenyl)-4-butylcyclohexane
1,1-bis(4-(1-(4-aminophenyl)tridecyl)phenyl)-4-butylcyclohexane
1,4-bis(4-(4-aminophenylmethyl)phenylmethyl)benzene
1,1-bis(4-(4-(4-aminophenylmethyl)phenylmethyl)phenyl)methane.

Among the above compounds, the following compounds can be mentioned as further preferable compounds:
1,2-bis(4-(4-aminobenzyl)phenyl)ethane
1,3-bis(4-(4-aminobenzyl)phenyl)propane
1,4-bis(4-(4-aminobenzyl)phenyl)butane
1,5-bis(4-(4-aminobenzyl)phenyl)pentane
1,6-bis(4-(4-aminobenzyl)phenyl)hexane
1,7-bis(4-(4-aminobenzyl)phenyl)heptane
1,8-bis(4-(4-aminobenzyl)phenyl)octane
1,9-bis(4-(4-aminobenzyl)phenyl)nonane
1,10-bis(4-(4-aminobenzyl)phenyl)decane
1,3-bis(4-(4-aminobenzyl)phenyl)-2-methylpropane
1,3-bis(4-(4-aminobenzyl)phenyl)-2-ethylpropane
1,3-bis(4-(4-aminobenzyl)phenyl)-2-propylpropane
1,3-bis(4-(4-aminobenzyl)phenyl)-2-butylpropane
1,3-bis(4-(4-aminobenzyl)phenyl)-2-pentylpropane
1,3-bis(4-(4-aminobenzyl)phenyl)-2-hexylpropane
1,3-bis(4-(4-aminobenzyl)phenyl)-2-heptylpropane
1,3-bis(4-(4-aminobenzyl)phenyl)-2-octylpropane
1,3-bis(4-(4-aminobenzyl)phenyl)-2-nonylpropane
1,3-bis(4-(4-aminobenzyl)phenyl)-2-decylpropane
1,1-bis(4-(4-aminobenzyl)phenyl)ethane
1,1-bis(4-(4-aminobenzyl)phenyl)propane
1,1-bis(4-(4-aminobenzyl)phenyl)butane
1,1-bis(4-(4-aminobenzyl)phenyl)pentane
1,1-bis(4-(4-aminobenzyl)phenyl)hexane
1,1-bis(4-(4-aminobenzyl)phenyl)heptane
1,1-bis(4-(4-aminobenzyl)phenyl)octane
1,1-bis(4-(4-aminobenzyl)phenyl)nonane
1,1-bis(4-(4-aminobenzyl)phenyl)decane
bis(4-(1-(4-aminophenyl)ethyl)phenyl)methane
bis(4-(1-(4-aminophenyl)propyl)phenyl)methane
bis(4-(1-(4-aminophenyl)butyl)phenyl)methane
bis(4-(1-(4-aminophenyl)pentyl)phenyl)methane
bis(4-(1-(4-aminophenyl)hexyl)phenyl)methane
bis(4-(1-(4-aminophenyl)heptyl)phenyl)methane
1,1-bis(4-(1-(4-aminophenyl)ethyl)phenyl)cyclohexane
1,1-bis(4-(1-(4-aminophenyl)propyl)phenyl)cyclohexane
1,1-bis(4-(1-(4-aminophenyl)butyl)phenyl)cyclohexane
1,1-bis(4-(1-(4-aminophenyl)pentyl)phenyl)cyclohexane
1,1-bis(4-(1-(4-aminophenyl)hexyl)phenyl)cyclohexane
1,1-bis(4-(1-(4-aminophenyl)heptyl)phenyl)cyclohexane
1,1-bis(4-(1-(4-aminophenyl)ethyl)phenyl)-4-butylcyclohexane
1,1-bis(4-(1-(4-aminophenyl)propyl)phenyl)-4-butylcyclohexane
1,1-bis(4-(1-(4-aminophenyl)butyl)phenyl)-4-butylcyclohexane
1,1-bis(4-(1-(4-aminophenyl)pentyl)phenyl)-4-butylcyclohexane
1,1-bis(4-(1-(4-aminophenyl)hexyl)phenyl)-4-butylcyclohexane
1,1-bis(4-(1-(4-aminophenyl)heptyl)phenyl)-4-butylcyclohexane
1,4-bis(4-(4-aminophenylmethyl)phenylmethyl)benzene
1,1-bis(4-(4-(4-aminophenylmethyl)phenylmethyl)phenyl)methane As to these compounds, only one compound may be used, and two or more compounds may be simultaneously used.

Further, $L^2$ in the formula (II) is a divalent aliphatic group of 2 to 12 carbon atoms or a divalent organic group of 4 to 36 carbon atoms, different from $L^1$, and group is a group containing at least one of aromatic group and alicyclic group, or a polysiloxane group expressed by the formula (IV).

Concrete examples of diamines containing these cores have no particular limitation, but the following compounds can be mentioned:

aliphatic diamines such as trimethylenediamine, tetramethylenediamine, hexamethylenediamine, 4,4-dimethylheptamethylenediamine, 2,11-dodecanediamine, etc., aromatic diamines such as bis(4-aminophenyl)ether, bis(4-aminophenyl)methane, bis(4-aminophenyl)sulfone, bis(4-aminophenyl)sulfide, bis(4-(3-aminophenoxy)phenyl)sulfone, 2,2-bis(4-(4-aminophenoxy)phenyl)propane, bis(4-(4-aminophenoxy)phenyl)sulfone, 1,2-diaminobenzene, 1,3-diaminobenzene, 1,4-diaminobenzene, benzidine, 2,2'-diaminobenzophenone, 4,4'-diaminobenzophenone, 2,2-bis(4-aminophenyl)propane, 1,5-diaminonaphthalene, etc., and alicyclic diamines such as 1,4-diaminocyclohexane, etc.

As concrete examples of diamines having a polysiloxane group as a core, the following compounds are mentioned:

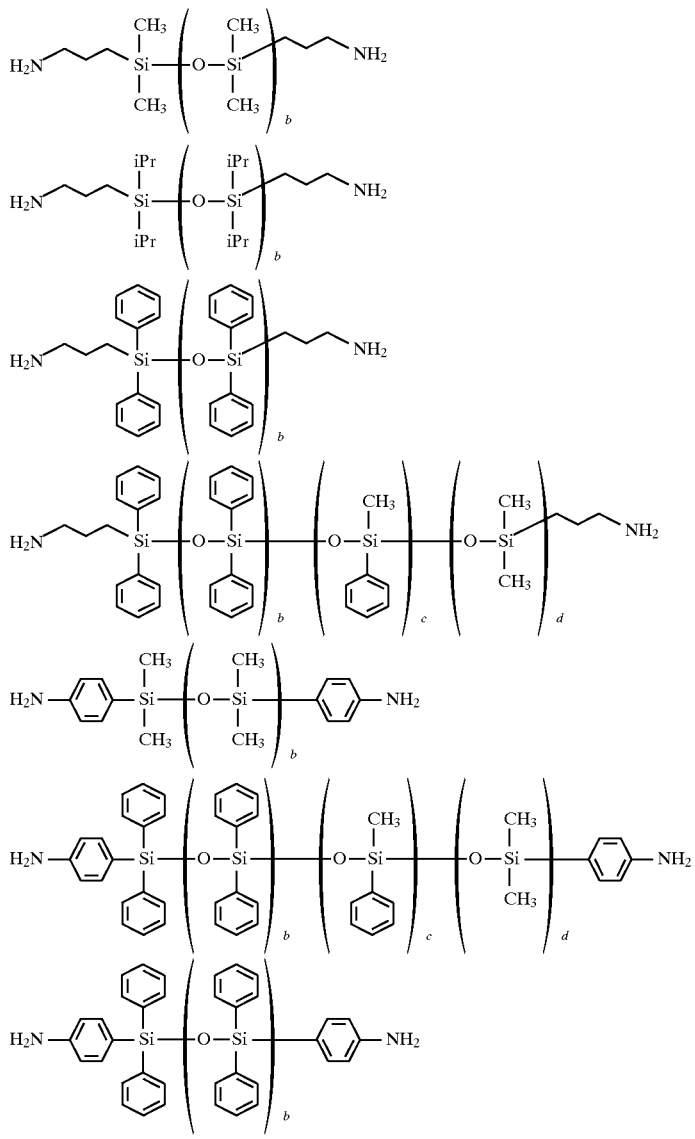

(b, c and d refer to an integer of one or more.)

The tetracarboxylic acid dianhydrides used for the polyimide film, liquid crystal aligning film and liquid crystal display element of the present invention, have the core structure of $G^1$ or $G^2$ shown in the formulas (I) and (II), and these groups are the same or different tetravalent organic groups of 4 to 30 carbon atoms, and those containing one or more members of aromatic groups or alicyclic groups.

The dianhydrides have no particular limitation, but concrete examples are as follows:
pyromellitic dianhydride,
3,3',4,4'-biphenyltetracarboxylic dianhydride,
2,2',3,3'-biphenyltetracarboxylic dianhydride,
2,3,3',4'-biphenyltetracarboxylic dianhydride,
3,3',4,4'-benzophenonetetracarboxylic dianhydride,
2,3,3',4'-benzophenonetetracarboxylic dianhydride,
2,2',3,3'-benzophenonetetracarboxylic dianhydride,
bis(3,4-dicarboxyphenyl)ether dianhydride,
bis(3,4-dicarboxyphenyl)sulfone dianhydride,
1,2,5,6-naphthalenetetracarboxylic dianhydride,
2,3,6,7-naphthalenetetracarboxylic dianhydride,
bis(dicarboxyphenyl)methane dianhydride,
cyclobutanetetracarboxylic dianhydride,
cyclopentanetetracarboxylic dianhydride,
cyclohexanetetracarboxylic dianhydride,
dicyclohexanetetracarboxylic dianhydride,
dicyclopentanetetracarboxylic dianhydride,
bis(dicarboxycyclohexyl)ether dianhydride, bis(dicarboxycyclohexyl)sulfone dianhydride,
bis(dicarboxycyclohexyl)methane dianhydride, etc.

These compounds may include those containing isomers, and it does not matter whether they may be mixtures of isomers. Further, two or more kinds of compounds may be simultaneously used. Further, it is unnecessary to restrict the tetracarboxylic dianhydrides used in the present invention to the above exemplified compounds.

The aminosilicon compounds used for the polyimides, liquid crystal aligning films and liquid crystal display elements of the present invention are primary amines having a core structure expressed by the formula (III), and concrete names are mentioned as follows:
3-aminopropyltrimethoxysilane
3-aminopropyltriethoxysilane
3-aminopropylmethyldimethoxysilane
3-aminopropylmethyldiethoxysilane
3-aminopropyltris(2-methoxyethoxy)silane
2-aminoethyltrimethoxysilane
2-aminoethyltriethoxysilane
2-aminoethylmethyldimethoxysilane
2-aminoethylmethyldiethoxysilane
4-aminobutyltrimethoxysilane
4-aminophenyltrimethoxysilane
4-aminophenyltriethoxysilane
4-aminophenylmethyldimethoxysilane
4-aminophenylmethyldiethoxysilane
4-aminophenyltris(2-methoxyethoxy)silane
3-(4-aminophenyl)propyltrimethoxysilane
3-(4-aminophenyl)propyltriethoxysilane
3-aminophenyltrimethoxysilane
3-aminophenyltriethoxysilane
3-(4-aminophenyl)propylmethyldimethoxysilane
3-(4-aminophenyl)propylmethyldiethoxysilane
3-aminophenylmethyldimethoxysilane
3-aminophenylmethyldiethoxysilane When the above diamine, tetracarboxylic acid and diaminosilicon compound are reacted with an acid anhydride group and an amino group in the presence of a known solvent such as N-methyl-2-pyrrolidone according to a known process, it is possible to obtain the polyamic acid of the present invention.

In this reaction, the diamine having a core of $L^1$ is used in a quantity of 50 mol % or more, preferably 70 mol % or more and more preferably 90 mol % or more, based upon the total amine. The quantity of the diamine having the polysiloxane group having the core structure expressed by the formula (V) is 50 mol % or less, preferably 30 mol % or less, more preferably 10 mol % or less, based upon the total diamine. Further, the quantity of the aminosilicon compound is preferably 30 mol % or less, more preferably 10 mol % or less, in the total raw materials.

The liquid crystal aligning film of the present invention is provided on the substrate as follows:

The polyamic acid as the precursor of polyimide, prepared according to the above process, is applied onto a substrate, followed by heat treatment for dehydration reaction, whereby it is possible to form the polyimide film on the substrate. If an alkoxysilane group expressed by the formula (III) is present at the terminal of the polyamic acid, the adjacent alkoxysilanes cause condensation reaction to each other to form a three-dimensional polymer.

Further, this will be concretely described:

A polyamic acid is dissolved in a solvent such as N-methyl-2-pyrrolidone (NMP), dimethylacetamide (DMAc), dimethylformamide (DME), dimethylsulfoxide (DMSO), ethyleneglycol monobutyl ether, diethylene glycol monoethyl ether, etc., to prepare a solution of 0.1 to 30% by weight, preferably 1 to 10% by weight, followed by applying the solution onto a substrate according to brushing process, immersion process, rotational application process, spray process, printing process, etc. to form a coating, vaporizing the solvent at 50° to 150° C., preferably 80° to 120° C., heat-treating the resulting coating at 150° to 400° C., preferably 180° to 280° C., to effect dehydration-ring closure reaction and thereby provide a polyimide high-molecular film. In this case, it is not always necessary to convert the amic acid into 100 mol % imide, but even a conversion into about 50 mol % may be employed in some use applications. However, conversion into 80 mol % or more is preferable. Before the coating, the substrate surface is treated with a silane coupling agent, followed by forming a high-molecular film thereon, whereby the adhesion of the high-molecular film onto the substrate can be improved. Thereafter by rubbing the resulting coated surface with a cloth or the like in one direction, to obtain a liquid crystal aligning film.

As to the substrate used for the liquid crystal display element, usually an electrode, concretely a transparent electrode of ITO (indium oxide-tin oxide) or tin oxide is formed on the substrate, and further, an undercoat such as insulating film, color filter, color filter overcoat, etc. for preventing alkali dissolution from the substrate may be provided between the electrode and the substrate, or an overcoat film such as insulating film, color filter film, etc. may be provided on the electrode. As to the constitution of such electrode, undercoat and others in the liquid crystal cell, conventional constitution of liquid crystal display element may be employed.

The two sheets of the substrates thus formed are retained at a definite distance so that the respective aligning films may be positioned inside, followed by sealing the periphery with epoxy resin or the like, to prepare a cell. In order to retain a given distance at that time, i.e. a cell gap, a gap agent is usually scattered. As the gap agent, glass beads, spherical particles of silica, alumina, synthetic resins, etc. are used. Liquid crystals are then filled in the cell, followed by sealing the filling inlet and gradually cooling them, to prepare a liquid crystal display element. Alternatively, liquid crystals may be scattered on substrates, followed by superposing the substrates, and sealing the liquid crystals so that the crystals may not leak, to prepare a liquid crystal display element. Further, if necessary, outside the cell, letter, figure, color filter, etc. may be printed or polarizing plate, reflecting plate, illumination, etc. may be provided.

As liquid crystals used for the liquid crystal display element of the present invention, one member or more of compounds (hereinafter referred to as component A), selected from the group consisting of compounds expressed by the above formulas (XI), (XII), (XIII) and (XIV) are preferable. Further, at least one member of compounds (hereinafter referred to as component B) selected from compounds of the group consisting of the formulas (XV) and (XVI) may be blended. Further, known compounds may be blended in order to adjust threshold voltage, liquid crystal phase temperature range, optical anisotropy, dielectric anisotropy, viscosity, etc.

Among the above component A, the following (7-1) to (7-15) are mentioned as preferable examples included in the formula (XI); the following (8-1) to (8-48) are mentioned as preferable examples included in the formula (8); and the following (9-1) to (9-41) are mentioned as preferable examples included in the formula (9):

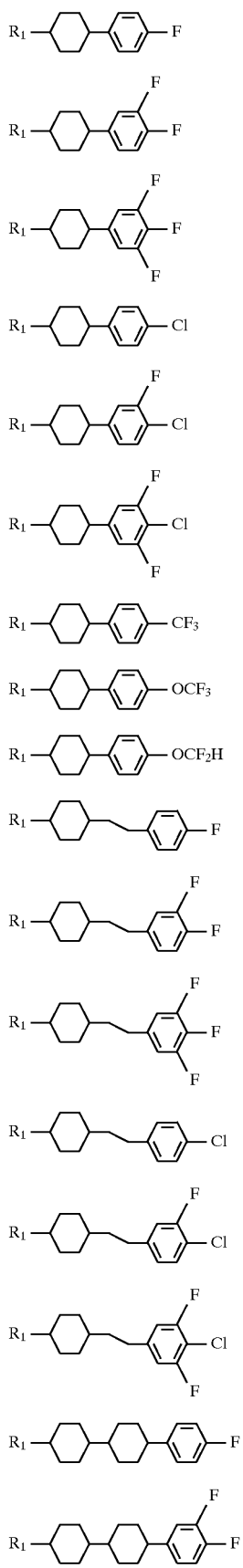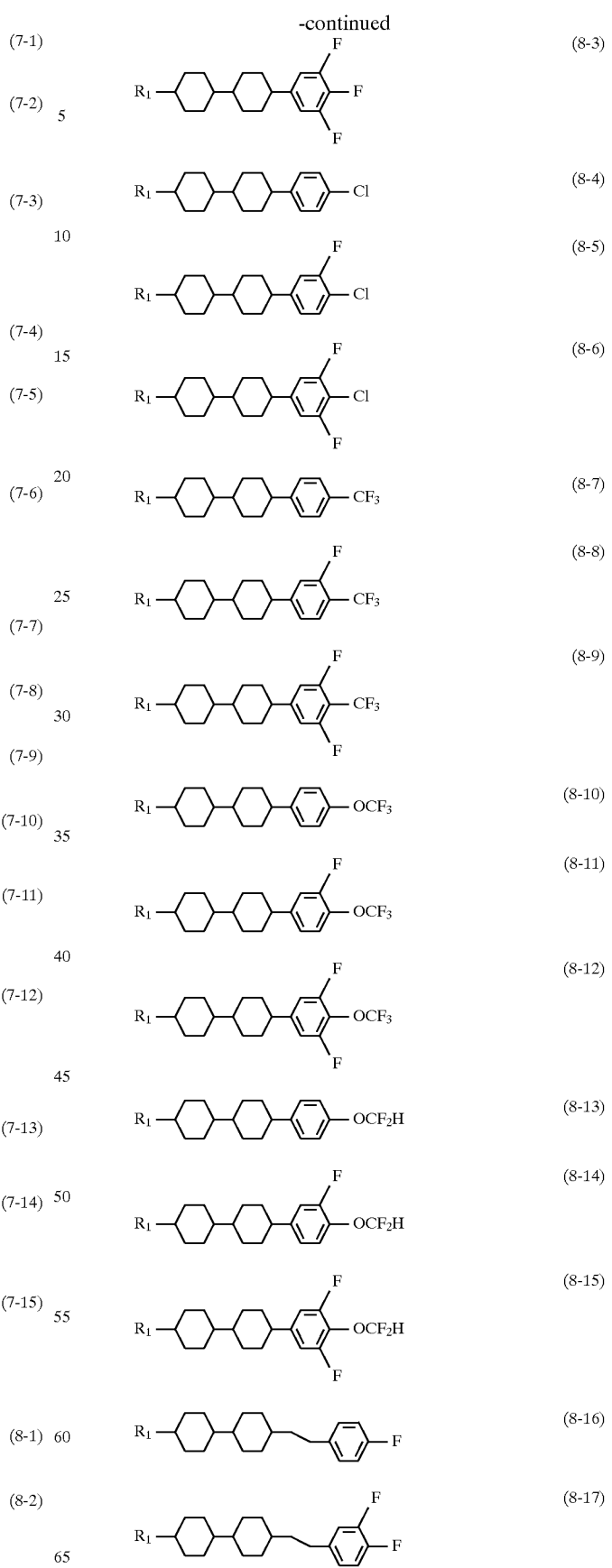

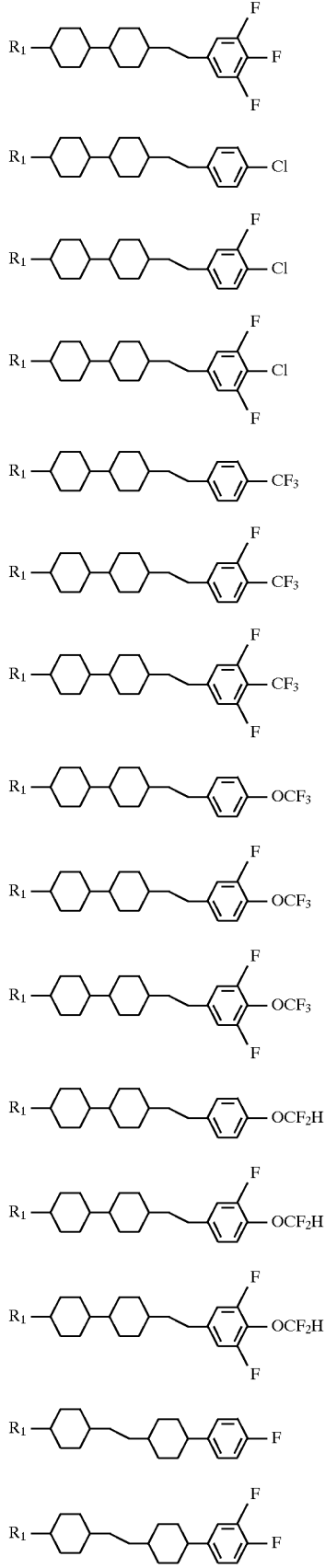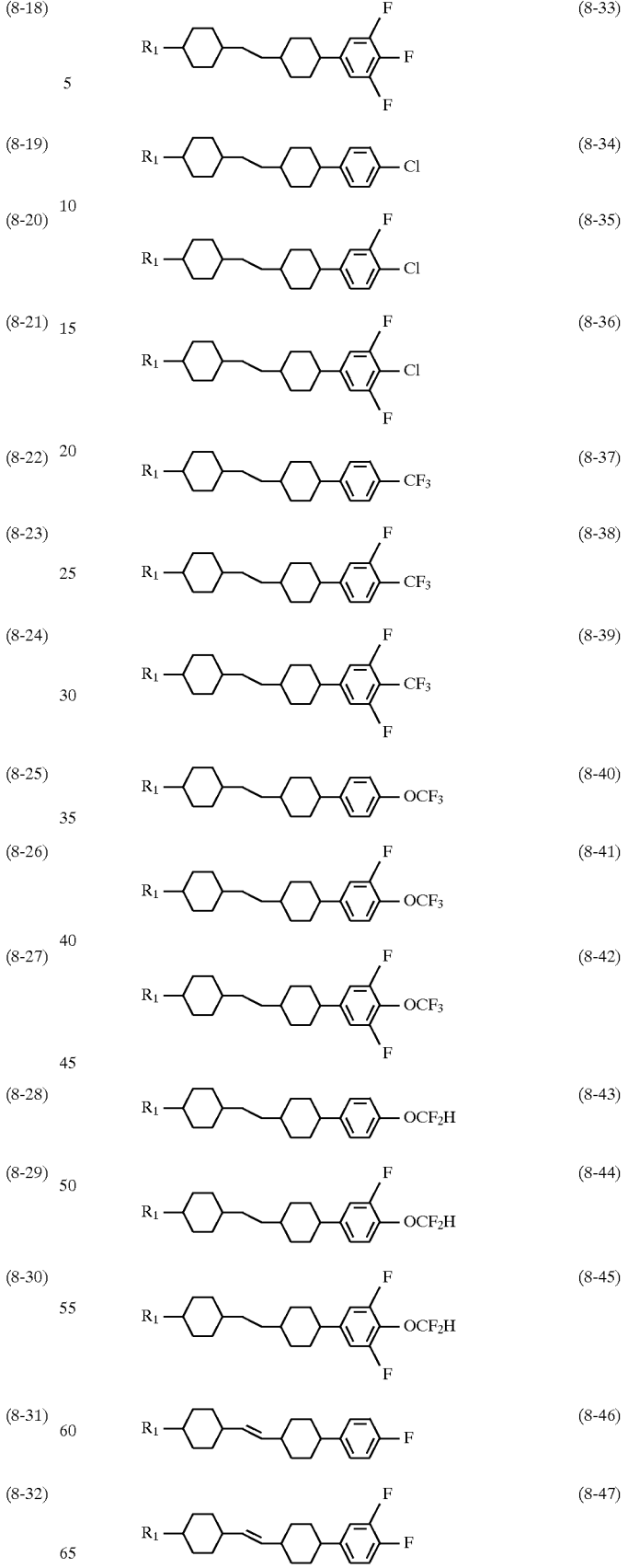

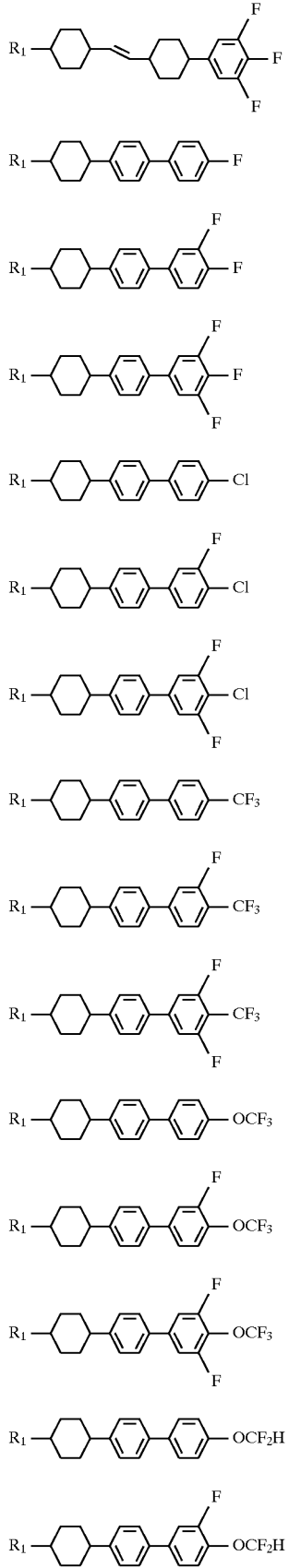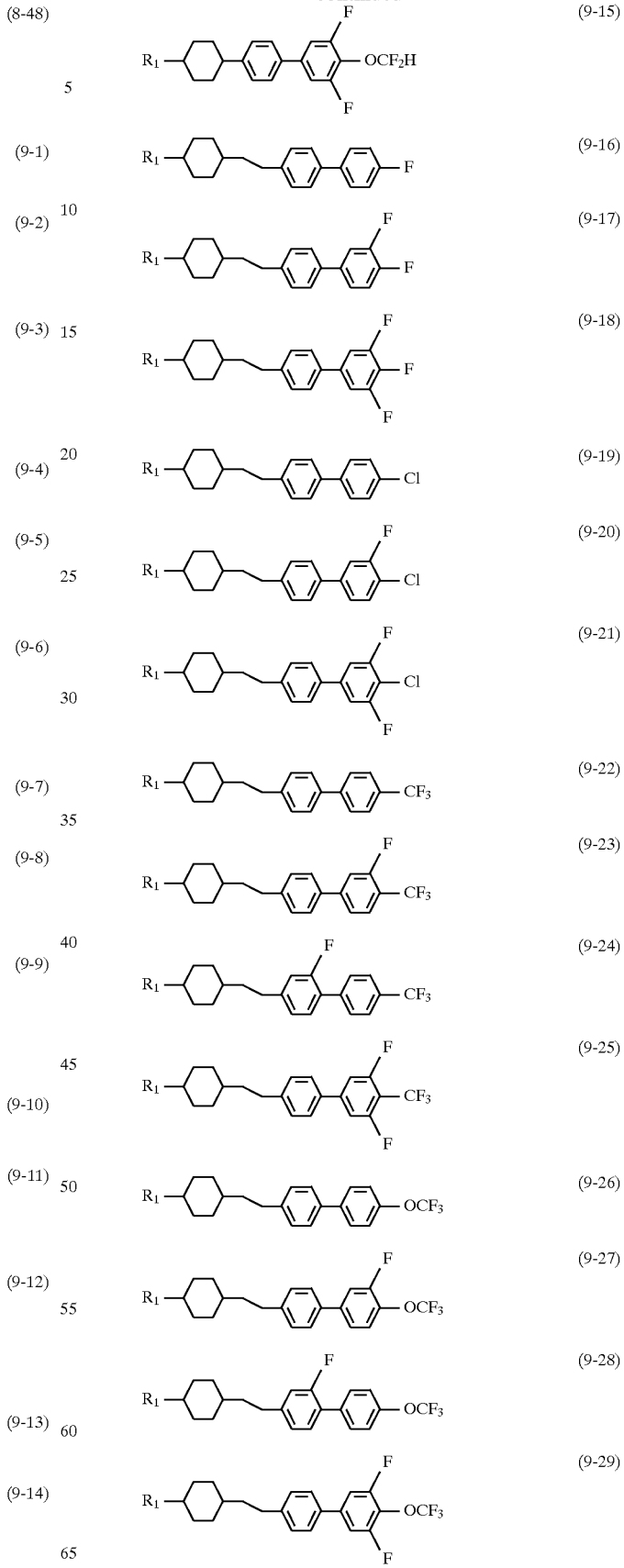

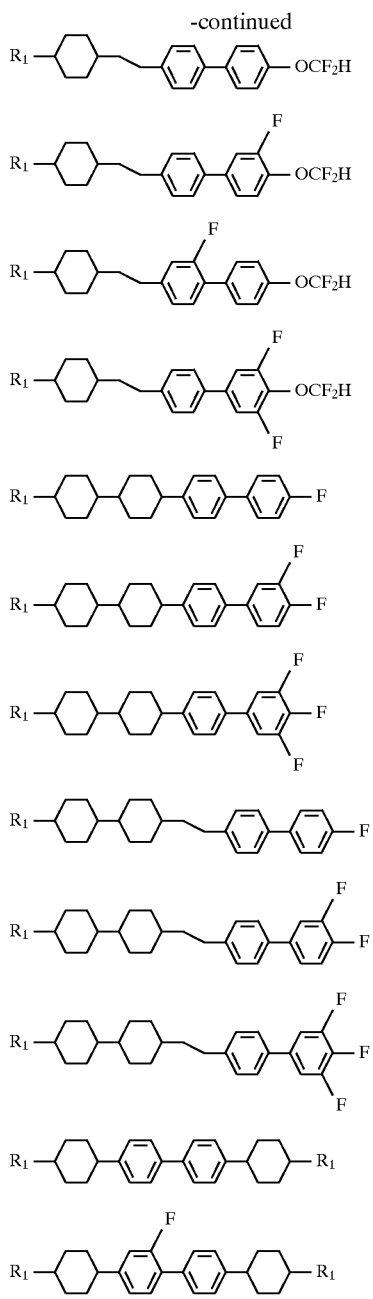

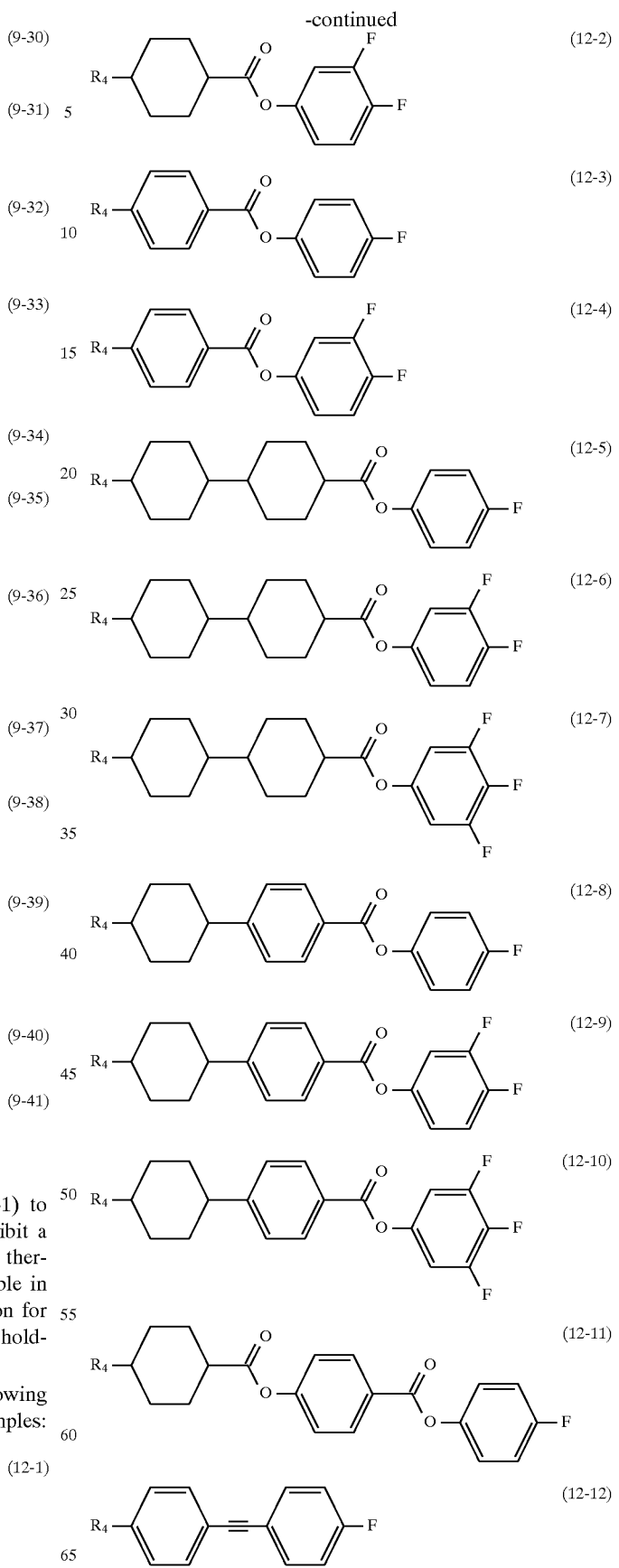

The compounds expressed by these formulas (7-1) to (7-15), (8-1) to (8-48) and (9-1) to (9-41) each exhibit a positive dielectric anisotropy value and a far superior thermal stability; hence these compounds are indispensable in the case of preparation of a liquid crystal composition for AM-LCP (TFT) requiring particularly a high voltage holding ratio and a high reliability.

Next, among the above component A, the following (12-1) to (12-13) can be mentioned as preferable examples:

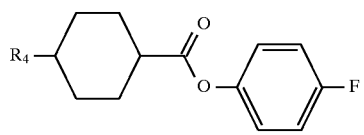

These compounds exhibit a large positive dielectric anisotropy value and are used as a composition component particularly for reducing the threshold voltage. Further, they are used for viscosity adjustment, Δn adjustment, and for broadening nematic phase temperature range such as for elevating clearing point, and for improving steepness.

Further, among component B, (13-1) to (13-15) and (14-1) to (14-14) can be mentioned as preferable examples.

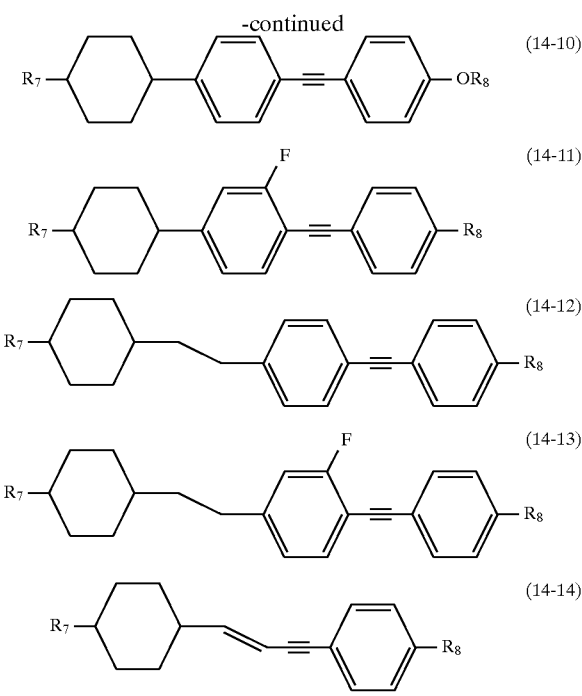

These compounds have a negative or slightly positive dielectric anisotropy value, and among these compounds, those of the formulas (13-1) to (13-15) are used as a composition component mainly for lowering the viscosity and adjusting the Δn, and compounds expressed by the formulas (14-1) to (14-14) are used for broadening the nematic range such as elevating the clearing point and for adjusting the Δn.

As described above, as to the preparation of liquid crystal composition for TFT, the composition may be composed of component A, but it may partly contain component B.

The liquid crystal composition used for the liquid crystal display element of the present invention can be generally prepared according to conventional process such as a process of dissolving various components with each other at a high temperature. Further, as to the liquid crystal display element of the present invention, when a suitable additive is added to the used liquid crystal composition, the element is improved corresponding to the aimed application uses and optimized. Such an additive has been known to person of the skill in the art and has been described in literatures in details. Usually, a chiral dopant for inducing the helical structure of liquid crystal to adjust necessary twist angle and preventing the reverse twist, or the like, is added.

The liquid crystal display element of the present invention includes a liquid crystal display element of guest-host (GH) mode obtained by incorporating a dichroic pigment such as those of merocyanine group, styryl group, azo group, azomethine group, azoxy group, chinophthalone group, anthraquinone group, tetrazine group, etc. in the liquid crystal composition used, NCAP prepared by microcapsulating nematic liquid crystals, polymer-dispersed type liquid crystal display element (PDLCD), represented by three-dimensional network polymer liquid crystal display element (PNLCD), and besides, liquid crystal display elements of birefringence control (ECB) mode and dynamic scattering (DS) mode.

The liquid crystal display element of the present invention is characterized in that image sticking occurs scarcely; a high voltage holding ratio can be kept over low temperature to high temperature, particularly even at relatively high temperatures of 60° to 90° C.; and further, Vth unevenness does not occur at the peripheral part of liquid crystal panel even under an atmosphere of high temperature and high humidity.

Embodiment of practice of the present invention

A BRIEF DESCRIPTION OF THE DRAWINGS

The present invention will be described in more detail, by means of examples, but it should not be construed to be limited to these examples.

In the following examples and comparative examples, the extent of image sticking was measured by employing C-V curve method. The C-V curve method refers to a method of impressing an alternate current of 25 mV and 1 kHz to a liquid crystal cell, further superimposing a direct current triangular wave (hereinafter referred to as DC voltage) of a frequency of 0.0036 Hz, and recording a capacity (C) varied by sweeping DC voltage in a range of −10V and 10V. When DC voltage is swept toward the positive side (0→10V), the capacity becomes greater. Next, when it is swept toward the negative side (10→0V), the capacity becomes smaller. When the voltage is swept from 0 toward negative side (0→−10V), the capacity again becomes greater, and when the voltage is swept toward the positive side (−10→0V), it again becomes smaller. When this procedure is repeated in several cycles, a wave form as shown in FIG. 1 is obtained. Deviation of charge occurs on the surface of the liquid crystal aligning film, and when this deviation is stabilized, the voltages depict hysteresis curves both on the positive side and the negative side as shown in FIG. 1.

Based upon this FIG. 1, tangent lines are drawn relative to the respective C-V curves, and lines showing capacity ($C_0$) at the time of DC voltage=zero are drawn. And the respective intersections ($\alpha_1$–$\alpha_4$) thereof are sought, and the voltage differences between the respective two points on the positive side $|\alpha_1-\alpha_2|$ and on the negative side $|\alpha_3-\alpha_4|$ are sought. Thereafter, the average voltage difference i.e. ($|\alpha_1-\alpha_2|+|\alpha_3-\alpha_4|$)/2 is sought and the resulting value is referred to as residual charge. When the film thickness of the liquid crystal cell and the film thickness of the aligning film are same, the residual charge can be employed as parameters showing the deviation of charge and its stabilization. Namely, when an aligning film having a smaller residual charge is used, the image sticking can be relieved as much.

The voltage holding ratio was measured by way of a circuit as shown in FIG. 2. The measurement method was carried out by reading a drain (Vd) varied by impressing a rectangular wave (Vs) of a gate pulse width of 69 μs, a frequency of 30 Hz and a wave height of ±4.5V, to a source, by means of an osilloscope. For example, when a positive rectangular wave is impressed to the source, the drain (Vd) shows a positive value before the subsequent negative rectangular wave is impressed. If the ratio is 100%, Vd shown in FIG. 3 follows a rectangular orbit expressed by the dotted line, but Vd usually follows a solid line orbit gradually approaching zero. Thus, the measured area of the orbit (area surrounded by V=0 and the orbit) i.e. the oblique line part was calculated four times, and the average value was sought. An area in the case where the voltage was entirely not lowered, was made 100%, and the relative value of the measured area thereto was made a voltage holding ratio (%).

The evaluation of Vth unevenness was carried out by retaining a liquid crystal element in a high temperature and high humidity vessel of 60° C. and 90% humidity for 200 hours, followed by totally lighting and observing the Vth unevenness at the peripheral part of the panel.

EXAMPLE

Example 1

Into a 200 ml, four-necked flask equipped with a stirring means, a thermometer, a condenser and a nitrogen gaspurging means, dehydrated and purified N-methyl-2-pyrrolidone (50 g) and successively, 1,4-bis(4-(4-aminobenzyl)phenyl)butane (7.00 g) were fed, followed by dissolving and stirring, and cooling the solution down to 13° C., at a time feeding pyromellitic acid dianhydride (3.69 g), reacting them under cooling and with stirring, and after one hour, adding p-aminophenyltrimethoxysilane (0.11 g), and reacting them with stirring at 20° C. for one hour. The logarithmic viscosity number of the resulting polyamic acid was 1.24 dl/g.

The reaction solution was diluted with N-methyl-2-pyrrolidone (NMP) (47.2 g), to obtain a transparent solution of a polyamic acid (10% by weight).

A mixed solution of ethylene glycol monobutyl ether and NMP (1:1) was added to the above solution, to dilute the polyamicacid into a 3% by weight solution, followed by heating the resulting solution at 50° C. till the rotational viscosity reached 15 mP.s, applying the solution onto a transparent glass substrate provided with an ITO electrode on one of the surfaces, according to rotary application process (spinner process) under rotation conditions of 5,000 rpm, 15 sec., thereafter drying at 100° C. for 10 minutes, elevating the temperature up to 200° C. over one hour in an oven, heat-treating at 200° C. for 90 minutes, to obtain a polyimide film having a film thickness of about 60 nm, rubbing-treating the respective coated surfaces of two sheets of substrates having a polyimide film formed thereon, to obtain liquid crystal aligning films, composing a liquid crystal cell having a cell thickness of 6 microns so that the rubbing directions might be parallel and opposed to each other, sealing liquid crystals FB01 for TFT made by Chisso Corporation in the cell, thereafter carrying out isotropic treatment at 120° C. for 30 minutes and slowly cooling down to room temperature, to obtain a liquid crystal element.

This liquid crystal element exhibited a residual charge of 0.06V at 25° C. and voltage holding ratios of 98.1%, 97.2% and 95.0%, respectively at 20° C., 60° C. and 90° C.

Further, occurrence of Vth unevenness at the peripheral part of the panel was not observed. In addition, the infrared absorption spectra of the polyamic acid and the polyimide film of the present invention are shown in FIG. 4 and FIG. 5.

Example 2

A polyamic acid was obtained in the same manner as in Example 1, except that pyromellitic acid dianhydride (3.69 g) of Example 1 was replaced by 3,3',4,4'-biphenyltetracarboxylic acid dianhydride (4.98 g), to obtain a polyamic acid having a logarithmic viscosity number of 1.82 dl/g. Using this acid, a liquid crystal element was obtained according to Example 1.

This liquid crystal element exhibited a residual charge of 0.05 V at 25° C. and voltage holding ratios of 98.1%, 97.0% and 95.5%, respectively at 20° C., 60° C. and 90° C. Further, occurrence of Vth unevenness at the peripheral part of the panel was not observed.

Example 3

A polyamic acid was obtained in the same manner as in Example 1, except that 1,4-bis(4-(4-aminobenzyl)phenyl)butane (7.00 g) was replaced by 1,1-bis(4-(4-aminobenzyl)phenyl)nonane (8.02 g), and paraaminophenyltrimethoxysilane (0.11 g) was replaced by 1,3-bis(3-aminopropyl)-1,1,3,3-tetramethyldisiloxane (0.14 g). This polyamic acid exhibited a logarithmic viscosity number of 1.08 dl/g. Using this polyamic acid, a liquid crystal element was obtained according to Example 1.

This liquid crystal element exhibited a residual charge of 0.07 V at 25° C. and voltage holding ratios of 98.6%, 97.5% and 95.1%, respectively, at 20° C., 60° C. and 90° C. Further, occurrence of Vth unevenness at the peripheral part of the panel was not observed.

Example 4

A polyamic acid was obtained in the same manner as in Example 1, except that 1,4-bis(4-(4-aminobenzyl)phenyl) butane (7.00 g) was replaced by 1,3-bis(4-(4-aminobenzyl)phenyl)-2-n-butylpropane (7.83 g), and paraaminophenyltrimethoxysilane was not used. This polyamic acid exhibited a logarithmic number viscosity of 2.45 dl/g, and using this polyamic acid, a liquid crystal element was obtained in the same manner as in Example 1.

This liquid crystal element exhibited a residual charge of 0.08V at 25° C., and voltage holding ratios of 98.4%, 97.6% and 95.6%, respectively at 20° C., 60° C. and 90° C. Further, occurrence of Vth unevenness at the peripheral part of the panel was not observed.

Example 5

A polyamic acid was obtained in the same manner as in Example 1, except that 1,4-bis(4-(4-aminobenzyl)phenylbutane (7.00 g) was replaced by 1,1-bis(4-(1-(4-aminophenyl)propyl)phenyl)methane (7.35 g), and paraaminophenyltrimethoxysilane was not used. This polyamic acid exhibited a logarithmic viscosity number of 1.98 dl/g.

Using this polyamic acid, a liquid crystal element was obtained in the same manner as in Example 1.

This liquid crystal element exhibited a residual charge at 25° C. of 0.07, and voltage holding ratios of 97.9%, 97.0% and 94.7%, respectively at 20° C., 60° C. and 90° C. Further, occurrence of Vth unevenness at the peripheral part of the panel was not observed.

Example 6

A polyamic acid was obtained in the same manner as in Example 1, except that 1,4-bis(4-(4-aminobenzyl) phenyl) butane (7.00 g) was replaced by 1,1-bis(4-(1-(4-aminophenyl)ethyl)phenyl)-4-methylcyclohexane (8.23 g), and paraaminophenyltrimethoxysilane was not used. This polyamic acid exhibited a logarithmic viscosity number of 1.33 dl/g. Using this polyamic acid, a liquid crystal element was obtained in the same manner as in Example 1.

This liquid crystal element exhibited a residual charge at 25° C. of 0.05 V, and voltage holding ratios of 98.7%, 97.8% and 95.5%, respectively at 20° C., 60° C. and 90° C. Further, occurrence of Vth unevenness at the peripheral part of the panel was not observed.

Example 7

A polyamic acid was obtained according to Example 1, using 1,1-bis(4-(1-(4-aminophenyl)propyl)phenyl) cyclohexane (8.35 g), pyromellitic dianhydride (4.15 g) and paraaminophenyltrimethoxysilane (0.91 g).

This polyamic acid exhibited a logarithmic viscosity number of 0.72 dl/g. Using this polyamic acid, a liquid crystal element was obtained in the same manner as in Example 1.

This liquid crystal element exhibited a residual charge at 25° C. of 0.04V, and voltage holding ratios of 98.7%, 98.0% and 95.7%, respectively at 20° C., 60° C. and 90° C. Further, occurrence of Vth unevenness at the peripheral part of the panel was not observed.

Example 8

A polyamic acid was obtained in the same manner as in Example 1, except that 1,4-bis(4-(4-aminobenzyl) phenyl) butane (7.00 g) was replaced by 1,4-bis(4-(4-aminophenylmethyl)phenylmethyl)benzene (9.31 g), and pyromellic acid dihydride (3.69 g) was replaced by 3,3',4,4'-biphenyltetracarboxylic dianhydride (4.98 g). This polyamic acid exhibited a logarithmic viscosity number of 1.93 dl/g. Using this polyamic acid, a liquid crystal element was obtained in the same manner as in Example 1.

This liquid crystal element exhibited a residual charge at 25° C. of 0.08V, and voltage holding ratios of 98.3%, 97.4% and 94.7%, respectively at 20° C., 60° C. and 90° C. Further, occurrence of Vth unevenness at the peripheral part of the panel was not observed.

Example 9

A polyamic acid was obtained in the same manner as in Example 1, except that 1,4-bis(4-(4-aminobenzyl)phenyl) butane (7.00 g) was replaced by 1,1-bis(4-(4-(4-aminophenylmethyl)phenylmethyl)phenyl)methane (11.10 g), and pyromellitic dianhydride (3.69 g) was replaced by 3,3',4,4'-biphenyltetracarboxylic acid dianhydride (4.98 g). This polyamic acid exhibited a logarithmic viscosity number of 1.77 dl/g. Using this acid, a liquid crystal element was obtained in the same manner as in Example 1.

The liquid crystal element exhibited a residual charge at 25° C. of 0.06V and voltage holding ratios of 98.1%, 97.3% and 95.0%, respectively at 20° C., 60° C. and 90° C. Further, occurrence of Vth unevenness at the peripheral part of the panel was not observed.

Example 10

Liquid crystal elements were obtained in the same manner as in Example 1, except that the same polyamic acid as in Example 1 was used, but the liquid crystal composition used for TFT was varied to those of (LA) to (LE).

The respective constitutions of the liquid crystal compositions (LA) to (LE) are shown in Tables 1 to 10, and the respective physical properties of (LA) to (LE) are shown in Table 11.

TABLE 3-continued

Liquid crystal composition (LB)

C₅H₁₁—⟨cyclohexyl⟩—CH₂CH₂—⟨cyclohexyl⟩—⟨phenyl(3,4,5-triF)⟩  9%

C₃H₇—⟨cyclohexyl⟩—⟨cyclohexyl⟩—⟨phenyl(3,4,5-triF)⟩  6%

C₃H₇—⟨cyclohexyl⟩—⟨cyclohexyl⟩—CH₂CH₂—⟨phenyl(3,4,5-triF)⟩  10%

C₅H₁₁—⟨cyclohexyl⟩—⟨cyclohexyl⟩—CH₂CH₂—⟨phenyl(3,4,5-triF)⟩  7%

C₃H₇—⟨cyclohexyl⟩—⟨phenyl⟩—⟨phenyl(3,4,5-triF)⟩  9%

TABLE 4

Liquid crystal composition (LB)

C₅H₁₁—⟨cyclohexyl⟩—⟨phenyl⟩—⟨phenyl(3,4,5-triF)⟩  9%

C₃H₇—⟨cyclohexyl⟩—⟨cyclohexyl⟩—COO—⟨phenyl(3,4,5-triF)⟩  10%

C₄H₉—⟨cyclohexyl⟩—⟨cyclohexyl⟩—COO—⟨phenyl(3,4,5-triF)⟩  3%

C₅H₁₁—⟨cyclohexyl⟩—⟨cyclohexyl⟩—COO—⟨phenyl(3,4,5-triF)⟩  3%

C₂H₅—⟨cyclohexyl⟩—⟨phenyl⟩—COO—⟨phenyl(2,3,5,6-tetraF)⟩  3%

TABLE 4-continued

Liquid crystal composition (LB)

C₃H₇—⟨cyclohexyl⟩—⟨phenyl⟩—COO—⟨phenyl(3,4,5-triF)⟩  3%

C₅H₁₁—⟨cyclohexyl⟩—⟨phenyl⟩—COO—⟨phenyl(3,4,5-triF)⟩  3%

C₃H₇—⟨cyclohexyl⟩—⟨cyclohexyl⟩—C₄H₉  5%

TABLE 5

Liquid crystal composition (LC)

C₇H₁₅—⟨cyclohexyl⟩—⟨phenyl(3,4,5-triF)⟩  4.0%

C₂H₅—⟨cyclohexyl⟩—⟨cyclohexyl⟩—⟨phenyl(3,4-diF)⟩  15.0%

C₃H₇—⟨cyclohexyl⟩—⟨cyclohexyl⟩—⟨phenyl(3,4-diF)⟩  15.0%

C₅H₁₁—⟨cyclohexyl⟩—⟨cyclohexyl⟩—⟨phenyl(3,4-diF)⟩  15.0%

C₂H₅—⟨cyclohexyl⟩—CH₂CH₂—⟨cyclohexyl⟩—⟨phenyl(3,4-diF)⟩  9.2%

C₃H₇—⟨cyclohexyl⟩—CH₂CH₂—⟨cyclohexyl⟩—⟨phenyl(3,4-diF)⟩  4.6%

C₅H₁₁—⟨cyclohexyl⟩—CH₂CH₂—⟨cyclohexyl⟩—⟨phenyl(3,4-diF)⟩  9.2%

TABLE 6

Liquid crystal composition (LC)

C₃H₇—⟨cyclohexyl⟩—⟨cyclohexyl⟩—⟨phenyl-F⟩  4.0%

C₂H₅—⟨cyclohexyl⟩—⟨cyclohexyl⟩—⟨phenyl(3,4,5-triF)⟩  4.0%

TABLE 6-continued

Liquid crystal composition (LC)

C₃H₇—⟨cyclohexyl⟩—⟨phenyl-3,4,5-triF⟩  5.0%

C₃H₇—⟨cyclohexyl⟩—⟨cyclohexyl⟩—COO—⟨phenyl⟩—⟨phenyl-4-F⟩  4.0%

C₅H₁₁—⟨cyclohexyl⟩—⟨cyclohexyl⟩—COO—⟨phenyl⟩—⟨phenyl-4-F⟩  3.0%

C₃H₇—⟨cyclohexyl⟩—⟨cyclohexyl⟩—⟨phenyl⟩—CH₃  8.0%

TABLE 7

Liquid crystal composition (LD)

C₃H₇—⟨cyclohexyl⟩—⟨phenyl⟩—Cl  4%

C₅H₁₁—⟨cyclohexyl⟩—⟨phenyl⟩—Cl  4%

C₇H₁₅—⟨cyclohexyl⟩—⟨phenyl⟩—Cl  5%

C₂H₅—⟨cyclohexyl⟩—⟨cyclohexyl⟩—⟨phenyl-3,4-diF⟩  10%

C₃H₇—⟨cyclohexyl⟩—⟨cyclohexyl⟩—⟨phenyl-3,4-diF⟩  10%

C₅H₁₁—⟨cyclohexyl⟩—⟨cyclohexyl⟩—⟨phenyl-3,4-diF⟩  10%

C₂H₅—⟨cyclohexyl⟩—⟨cyclohexyl⟩—⟨phenyl⟩—Cl  6%

TABLE 8

Liquid crystal composition (LD)

C₄H₉—⟨cyclohexyl⟩—⟨cyclohexyl⟩—⟨phenyl⟩—Cl  8%

C₅H₁₁—⟨cyclohexyl⟩—⟨cyclohexyl⟩—⟨phenyl⟩—Cl  7%

C₃H₇—⟨cyclohexyl⟩—⟨phenyl⟩—⟨phenyl-3,4,5-triF⟩  16%

TABLE 8-continued

Liquid crystal composition (LD)

C₅H₁₁—⟨cyclohexyl⟩—⟨phenyl⟩—⟨phenyl-3,4,5-triF⟩  16%

C₃H₇—⟨cyclohexyl⟩—⟨phenyl-3-F⟩—C≡C—⟨phenyl⟩—C₂H₅  4%

TABLE 9

Liquid crystal composition (LE)

C₅H₁₁—⟨cyclohexyl⟩—⟨phenyl⟩—F  12%

C₆H₁₅—⟨cyclohexyl⟩—⟨phenyl⟩—F  9%

C₇H₁₅—⟨cyclohexyl⟩—⟨phenyl⟩—F  7%

C₂H₅—⟨cyclohexyl⟩—⟨cyclohexyl⟩—⟨phenyl⟩—OCF₃  7%

C₃H₇—⟨cyclohexyl⟩—⟨cyclohexyl⟩—⟨phenyl⟩—OCF₃  11%

C₄H₉—⟨cyclohexyl⟩—⟨cyclohexyl⟩—⟨phenyl⟩—OCF₃  6%

C₅H₁₁—⟨cyclohexyl⟩—⟨cyclohexyl⟩—⟨phenyl⟩—OCF₃  10%

C₃H₇—⟨cyclohexyl⟩—⟨phenyl⟩—⟨phenyl-3,4-diF⟩  13%

TABLE 10

Liquid crystal composition (LE)

C₅H₁₁—⟨cyclohexyl⟩—⟨phenyl⟩—⟨phenyl-3,4-diF⟩  10%

C₃H₇—⟨cyclohexyl⟩—⟨cyclohexyl⟩—CH₂CH₂—⟨phenyl⟩—OCF₃  5%

C₅H₁₁—⟨cyclohexyl⟩—⟨cyclohexyl⟩—CH₂CH₂—⟨phenyl⟩—OCF₃  4%

C₃H₇—⟨cyclohexyl⟩—⟨phenyl-2-F⟩—⟨phenyl⟩—⟨cyclohexyl⟩—C₃H₇  2%

C₅H₁₁—⟨cyclohexyl⟩—⟨phenyl-2-F⟩—⟨phenyl⟩—⟨cyclohexyl⟩—C₃H₇  2%

C₅H₁₁—⟨cyclohexyl⟩—⟨phenyl-2-F⟩—⟨phenyl⟩—⟨cyclohexyl⟩—C₅H₁₁  2%

TABLE 11

|    | NI point (°C.) | Viscosity η₂₀ (mPa · s) | Δn 25° C. | Threshold voltage Vth (V) |
|----|---|---|---|---|
| LA | 87.5 | 20.6 | 0.090 | 1.88 |
| LB | 79.7 | 26.3 | 0.084 | 1.31 |
| LC | 118.3 | 26.4 | 0.083 | 2.00 |
| LD | 89.8 | 26.4 | 0.131 | 2.18 |
| LE | 95.0 | 14.8 | 0.096 | 2.43 |

The residual charges and voltage holding ratios of these liquid crystal elements are shown in the following Table 12. Further, occurrence of Vth unevenness at the peripheral part of the panel was not observed.

TABLE 12

|    | Residual charge (V) | Voltage holding ratio (%) | | |
|----|---|---|---|---|
|    | 25° C. | 20° C. | 60° C. | 90° C. |
| LA | 0.016 | 99.4 | 98.0 | 97.4 |
| LB | 0.015 | 99.3 | 98.4 | 97.3 |
| LC | 0.007 | 99.7 | 98.8 | 97.8 |
| LD | 0.010 | 99.5 | 98.6 | 97.0 |
| LE | 0.009 | 99.7 | 98.5 | 97.3 |

Example 11

Liquid crystal elements were obtained in the same manner as in Example 1 except that the liquid crystal composition used in Example 1 was varied to those to (LA) to (LE).

The residual charges and voltage holding ratios of these liquid crystal elements are shown in Table 13. Further, occurrence of the Vth unevenness at the peripheral part of the panel was not observed.

TABLE 13

|    | Residual charge (V) | Voltage holding ratio (%) | | |
|----|---|---|---|---|
|    | 25° C. | 20° C. | 60° C. | 90° C. |
| LA | 0.011 | 99.4 | 98.0 | 97.5 |
| LB | 0.016 | 99.2 | 98.1 | 96.8 |
| LC | 0.007 | 99.2 | 98.6 | 97.1 |
| LD | 0.019 | 99.0 | 98.4 | 96.9 |
| LE | 0.008 | 99.3 | 98.3 | 97.3 |

Comparative example 1

A polyamic acid was obtained in the same manner as in Example 1, except that 1,6-bis(4-(4-aminobenzyl)phenyl)hexane (7.95 g) was replaced by 2,2-bis(4-(4-aminophenoxy)phenyl)propane (7.40 g).

This polyamic acid exhibited a logarithmic viscosity number of 1.64 dl/g. Using this polyamic acid, a liquid crystal element was obtained in the same manner as in Example 1.

This element exhibited a residual charge at 25° C. of 0.20V, and voltage holding ratios of 90.0%, 82.3% and 65.6%, respectively at 20° C., 60° C. and 90° C. Further, Vth unevenness at the peripheral part of the panel occurred.

Comparative example 2

A polyamic acid was obtained in the same manner as in Example 1, except that 1,6-bis(4-(4-aminobenzyl)phenyl)hexane (7.95 g) was replaced by 4,4-diaminodiphenyl ether (3.33 g). This polyamic acid exhibited a logarithmic viscosity number of 1.51 dl/g. Using this polyamic acid a liquid crystal element was obtained in the same manner as in Example 1.

This liquid crystal element exhibited a residual charge at 25° C. of 0.26V, and voltage holding ratios of 89.0%, 80.1% and 58.4%, respectively, 20° C., 60° C. and 90° C. Further, Vth unevenness occurred at the peripheral part of the panel.

Comparative example 3

Liquid crystal elements were obtained in the same manner as in Example 1, except that the polyamic acid used in Comparative example 1 was used and the liquid crystals of (LA) to (LE) used in Example 10 were used.

The residual charges and potential retentions of these liquid crystal elements are shown in Table 14.

TABLE 14

|    | Residual charge (V) | Voltage holding ratio (%) | | |
|----|---|---|---|---|
|    | 25° C. | 20° C. | 60° C. | 90° C. |
| LA | 0.21 | 90.0 | 83.2 | 68.2 |
| LB | 0.30 | 87.8 | 79.8 | 58.7 |
| LC | 0.18 | 92.3 | 85.4 | 71.3 |
| LD | 0.25 | 88.6 | 80.6 | 55.9 |
| LE | 0.20 | 89.8 | 82.5 | 69.7 |

$V_S$ shows a rectangular wave of a gate pulse width of 69 µs, a frequency of 30 Hz and a wave height of ±4.5V.

Figure 1:
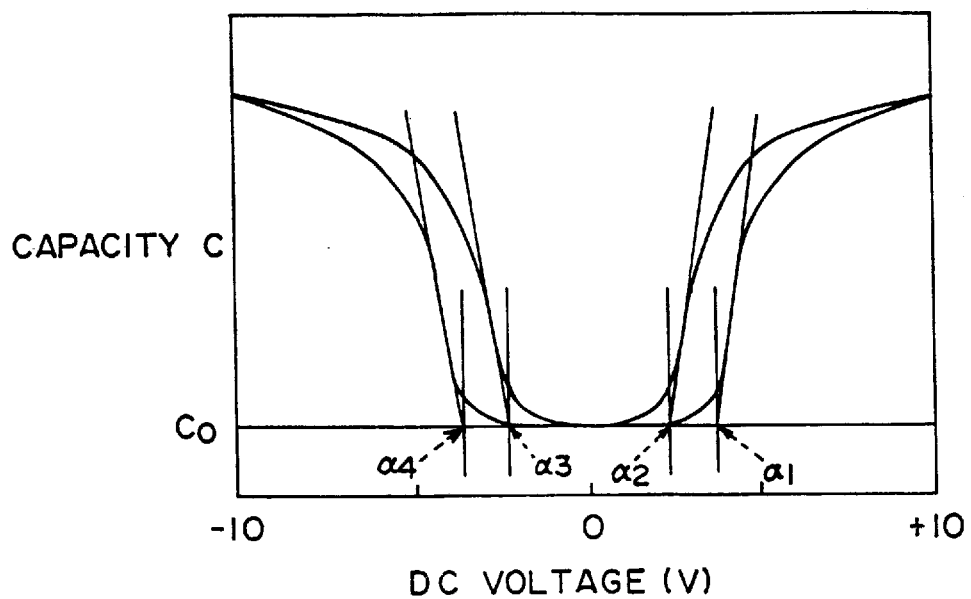
FIG. 1 shows a C-V hysteresis curve.
Figure 2:
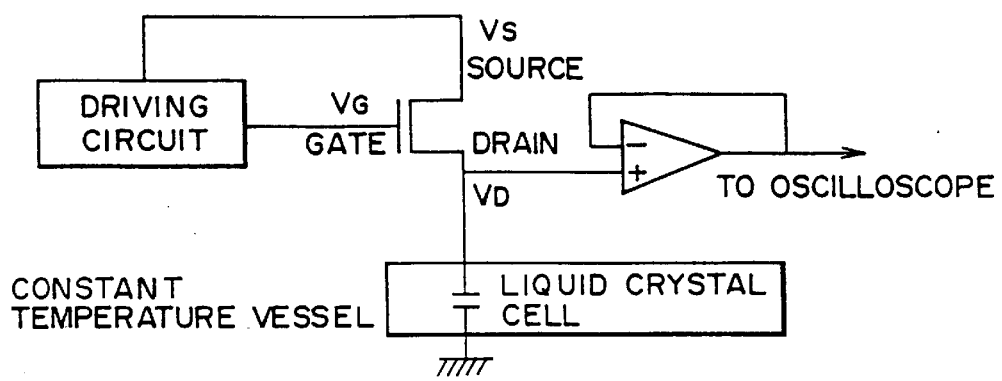
FIG. 2 shows a circuit figure used for measuring the voltage holding ratio.
Figure 3:
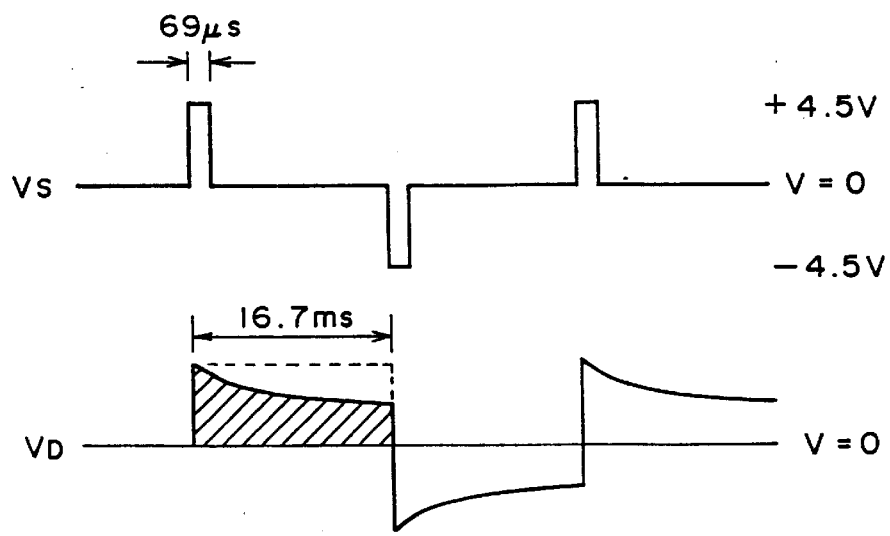
FIG. 3.

$V_D$ shows a wave obtained by impressing $V_S$ to the source of the circuit shown in FIG. 2, followed by reading by means of oscilloscope.

Figure 4:
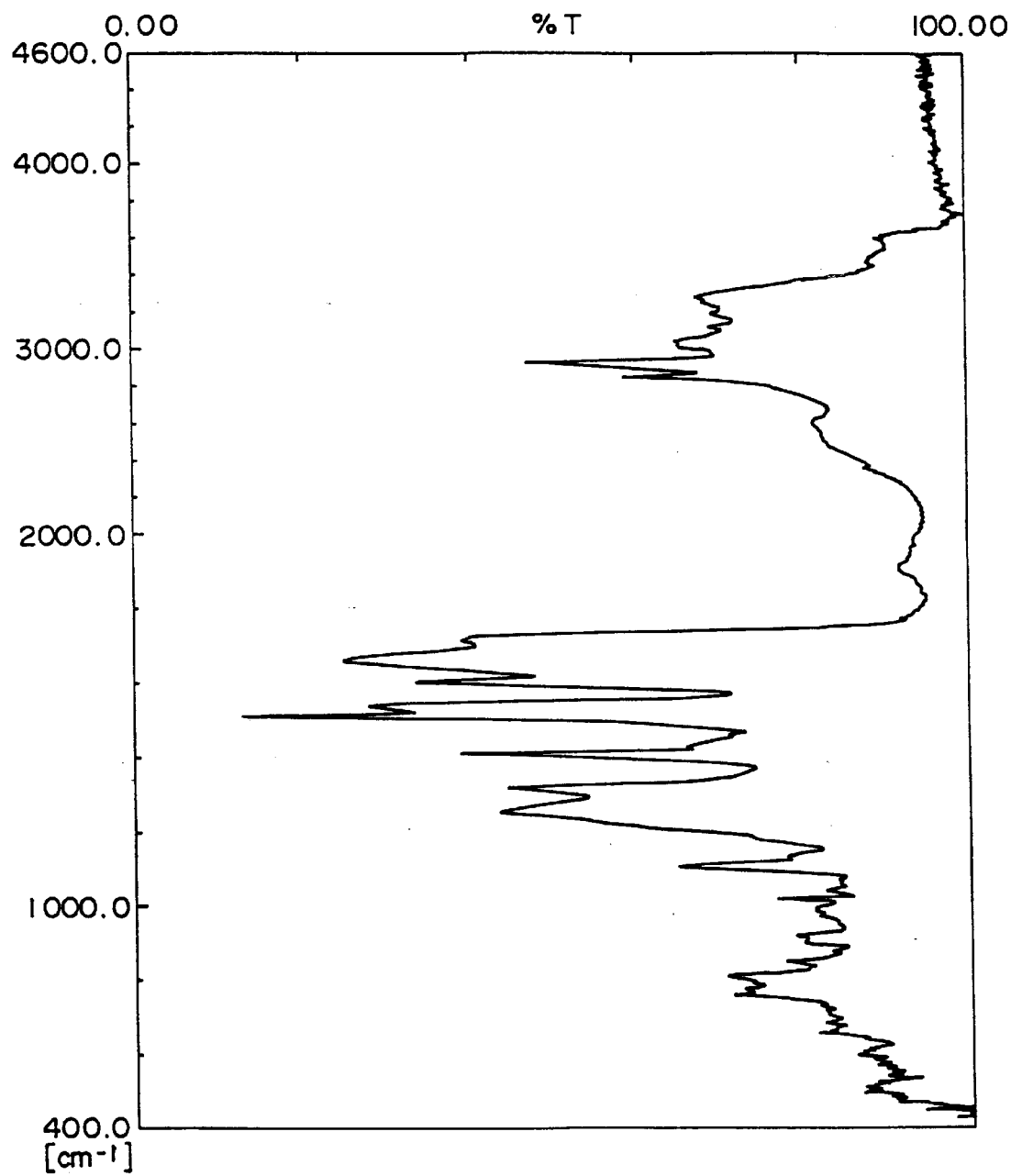

FIG. 4 shows the infrared absorption spectra of the polyamic acid prepared in Example 1.

Figure 5:
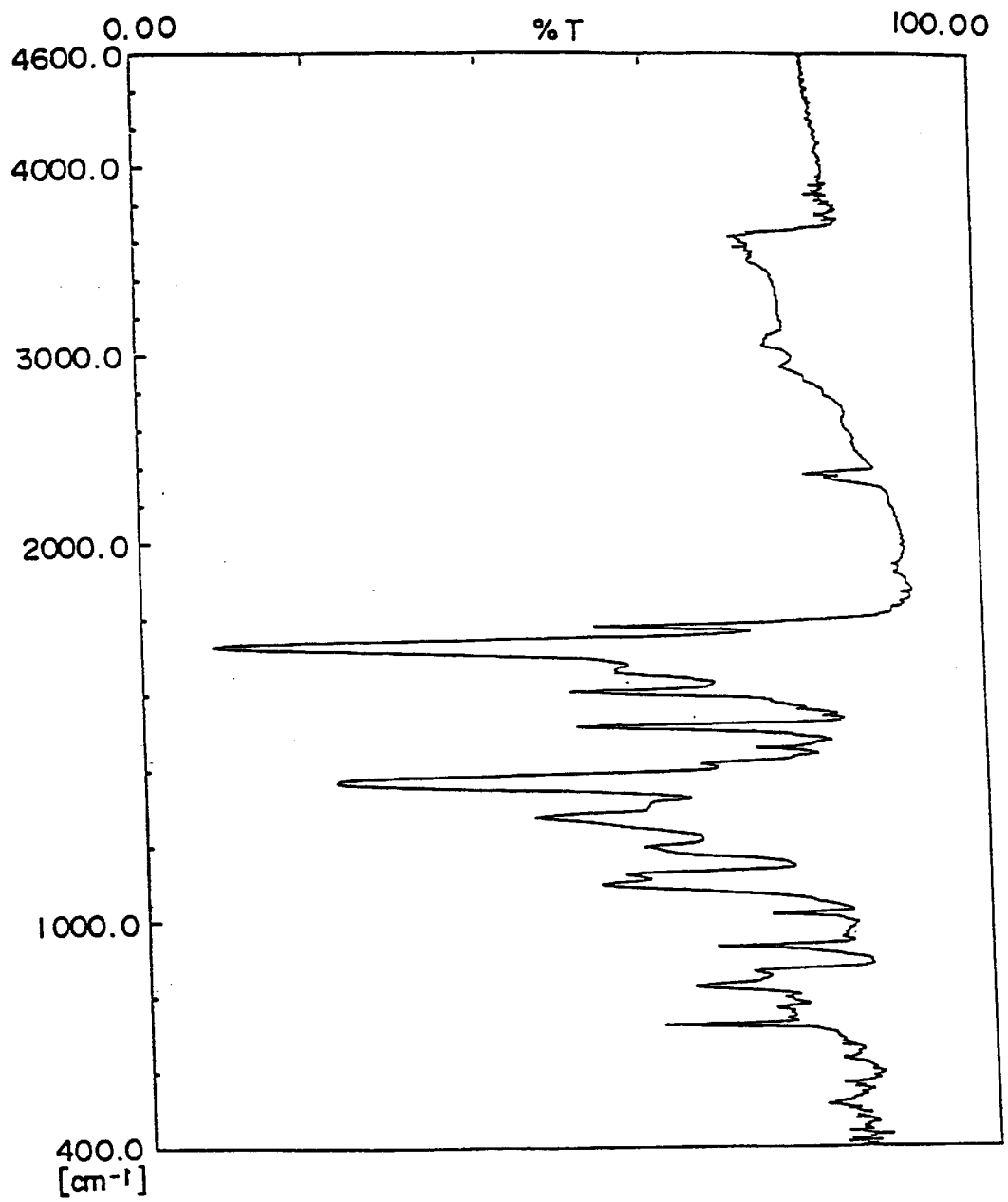

FIG. 5 shows the infrared absorption spectra of the polyimide film prepared in Example 1.

INDUSTRIAL APPLICABILITY

The polyamic acid of the present invention can be utilized not only for preparing polyimide film for liquid crystal aligning film, but also for various polyimide coating agent, or polyimide resin molded product, film, fibers, etc., making use of a characteristic of forming a polyimide resin having a relatively weak polarity.

We claim:

1. A polyimide film obtained by imidizing a polyamic acid, which polyamic acid comprising structural units of formulas (I) and (II):

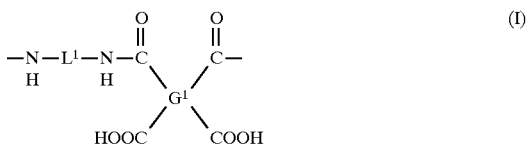

-continued

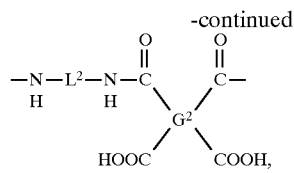
(II)

wherein the structural unit represented by the formula (I) is 50 to 100% by mol, and the molecular terminal is an amino group or an acid anhydride group or a carboxyl group obtained by hydrating the acid anhydride group, or a group of formula (III):

(III)

and said polyamic acid has a logarithmic viscosity number of 0.1 to 5 dl/g as measured in N-methyl-2-pyrrolidone, in a concentration of 0.5 g/dl and at a temperature of 30°±0.01° C., in the above formulas (I) and (II), $G^1$ and $G^2$ each are the same or different tetravalent organic groups of 4 to 30 carbon atoms, including at least one of an aromatic group and an alicyclic group;

$L^1$ is formula (IV),

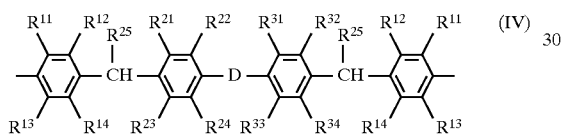
(IV)

and $L^2$ is by a divalent aliphatic group of 2 to 12 carbon atoms or a divalent organic group of 4 to 36 carbon atoms, different from $L^1$, the organic group including one member or more of an aromatic group and an alicyclic group, or a polysiloxane group of formula (V):

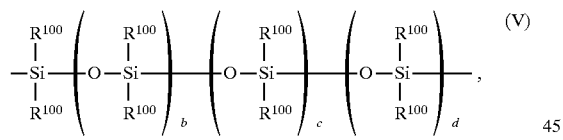
(V)

in the formula (III), Z is an alkylene group of 2 to 10 carbon atoms or a phenylene group; $R^{45}$ is an alkyl group, an alkenyl group of 1 to 10 carbon atoms or a phenyl group; $R^{46}$ is an alkyl group, an alkenyl group or an alkoxyalkyl group of 1 to 10 carbon atoms or a phenyl group; and m is an integer of 1 to 3, in the formula (IV), $R^{11}$, $R^{12}$, $R^{13}$, $R^{14}$, $R^{21}$, $R^{22}$, $R^{23}$, $R^{24}$, $R^{25}$, $R^{31}$, $R^{32}$, $R^{33}$ and $R^{34}$ each independently are hydrogen or a linear or branched alkyl group of 1 to 8 carbon atoms, and (a) when $R^{25}$ is a hydrogen atom, D is a linear or branched divalent hydrocarbon group of 2 to 30 carbon atoms or a formula (VI) or (VII):

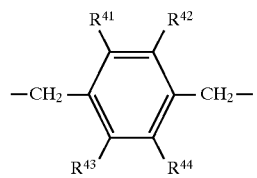
(VI)

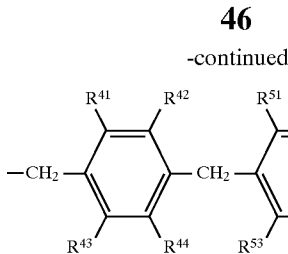
(VII)

and $R^{41}$, $R^{42}$, $R^{43}$, $R^{44}$, $R^{51}$, $R^{52}$, $R^{53}$ and $R^{54}$ each independently are hydrogen or a linear or branched alkyl group of 1 to 8 carbon atoms, and (b) when $R^{25}$ is a linear or branched alkyl group of 1 to 12 carbon atoms, D is a direct bond, an aliphatic group of 1 to 30 carbon atoms, an aromatic group of 6 to 30 carbon atoms or a hydrocarbon group having both of at least one aliphatic group and at least one aromatic group of 7 to 30 carbon atoms, but excluding a case where $R^{25}$ represents methyl group, D represents propan-2-ylidene group and $R^{11}$, $R^{12}$, $R^{13}$, $R^{14}$, $R^{21}$, $R^{22}$, $R^{23}$, $R^{24}$, $R^{31}$, $R^{32}$, $R^{33}$ and $R^{34}$, all represent hydrogen atom, and in the formula (V), $R^{100}$ independently is the same or different alkyl groups of 1 to 3 carbon atoms or phenyl groups, and b, c and d is 0 or a positive number and have a value of $1 \leq b+c+d \leq 100$.

2. A polyamic acid comprising structural units of formulas (I) and (II):

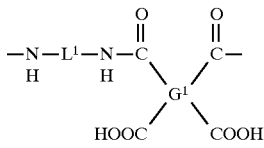
(I)

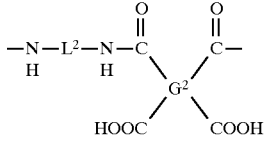
(II)

the structural unit represented by the formula (I) being 50 to 100% by mol, and the molecular terminal being an amino group, an acid anhydride group or a carboxyl group obtained by hydrating the acid anhydride group or a group of formula (III):

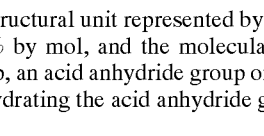
(III)

said polyamic acid having a logarithmic viscosity number of 0.1 to 5 dl/g as measured in N-methyl-2-pyrrolidone, in a concentration of 0.5 g/dl and at a temperature of 30° C.±0.01° C.

Wherein in the formulas (I) and (II), $G^1$ and $G^2$ each represent the same or different tetravalent organic groups of 4 to 30 carbon atoms, including at least one of an aromatic group and an alicyclic group; $L^1$ is represented by the formula (IV),

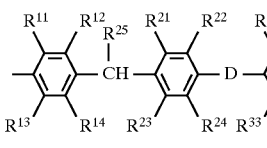
(IV)

and $L^2$ is represented by a divalent aliphatic group of 2 to 12 carbon atoms or a divalent organic group of 4 to 36 carbon atoms, different from L¹, the organic group including one member or more of an aromatic group or an alicyclic group, or a polysiloxane group represented by the formula (V):

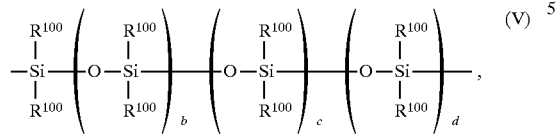

in the formula (III), Z is an alkylene group of 2 to 10 carbon atoms or a phenylene group; $R^{45}$ is an alkyl group or an alkenyl group of 1 to 10 carbon atoms or a phenyl group; $R^{46}$ is an alkyl group, an alkenyl group or an alkoxyalkyl group of 1 to 10 carbon atoms or a phenyl group; and m is an integer of 1 to 3, in the formula (IV), $R^{11}$, $R^{12}$, $R^{13}$, $R^{14}$, $R^{21}$, $R^{22}$, $R^{23}$, $R^{24}$, $R^{25}$, $R^{31}$, $R^{32}$, $R^{33}$, and $R^{34}$ each independently are hydrogen or a linear or branched alkyl group of 1 to 8 carbon atoms, and (a) when $R^{25}$ is hydrogen atom, D is a linear or branched divalent hydrocarbon group of 2 to 30 carbon atoms, or a formula (VI) or (VII):

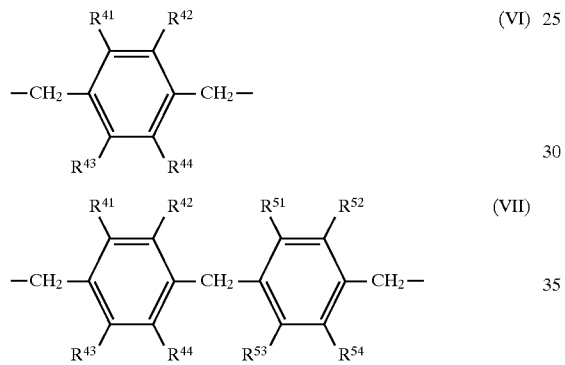

and $R^{41}$, $R^{42}$, $R^{43}$, $R^{44}$, $R^{51}$, $R^{52}$, $R^{53}$ and $R^{54}$ each independently represent hydrogen or a linear or branched alkyl group of 1 to 8 carbon atoms, and (b) when $R^{25}$ is a linear or branched alkyl group of 1 to 12 carbon atoms, D is a direct bond, an aliphatic group of 1 to 30 carbon atoms, an aromatic group of 6 to 30 carbon atoms or a hydrocarbon group having both of at least one aliphatic group and at least one aromatic group of 7 to 30 carbon atoms, but excluding a case where $R^{25}$ represents methyl group, D represents propane-2-ylidene group and $R^{11}$, $R^{12}$, $R^{13}$, $R^{14}$, $R^{21}$, $R^{22}$, $R^{23}$, $R^{24}$, $R^{31}$, $R^{32}$, $R^{33}$ and $R^{34}$ all represent hydrogen atom, and in the formula (V), $R^{100}$ independently is the same or different alkyl groups of 1 to 3 carbon atoms or phenyl groups, and b, c and d are 0 or a positive number and have a value of $1 \leq b+c+d \leq 100$.

3. A polyimide film according to claim 1, wherein in the formula (IV),

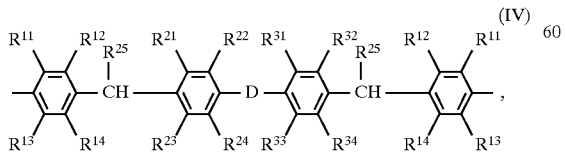

all of $R^{11}$, $R^{12}$, $R^{13}$, $R^{14}$, $R^{21}$, $R^{22}$, $R^{23}$, $R^{24}$, $R^{25}$, $R^{31}$, $R^{32}$, $R^{33}$ and $R^{34}$ are a hydrogen atom and D is

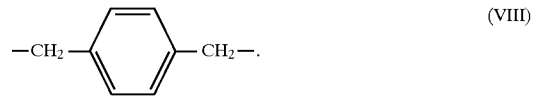

4. A polyimide film according to claim 1, wherein in the formula (IV), all of $R^{11}$, $R^{12}$, $R^{13}$, $R^{14}$, $R^{21}$, $R^{22}$, $R^{23}$, $R^{24}$, $R^{25}$, $R^{31}$, $R^{32}$, $R^{33}$ and $R^{34}$ are a hydrogen atom and D is

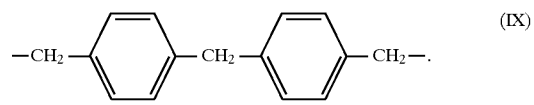

5. A polyimide film according to claim 1, wherein, in the formula (IV), $R^{25}$ represents hydrogen atom and D is a group of formula (X):

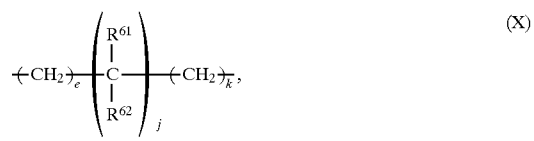

$R^{11}$, $R^{12}$, $R^{13}$ and $R^{14}$ independently are hydrogen atom or a linear or branched alkyl group of 1 to 8 carbon atoms, and $R^{21}$ and $R^{32}$; $R^{22}$ and $R^{31}$; $R^{23}$ and $R^{34}$; and $R^{24}$ and $R^{33}$, are the same atoms or groups, and the atoms or the groups of the respective sets each independently are hydrogen atom or a linear or branched alkyl group of 1 to 8 carbon atoms, and in the above formula (X), $R^{61}$ is hydrogen atom or a linear or branched alkyl group of 1 to 12 carbon atoms; $R^{62}$ represents a linear or branched alkyl group of 1 to 12 carbon atoms; e and k each independently is 0 to 10, and j is 0 to 20, and when j is 0, the sum of e and k is 2 or more, and when j is one or more, the sum of e and k is 0 or more.

6. A polyimide film according to claim 1, wherein, in the formula (IV), $R^{25}$ represents a linear or branched alkyl group of 1 to 12 carbon atoms; D represents a group selected from

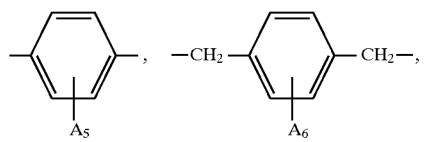

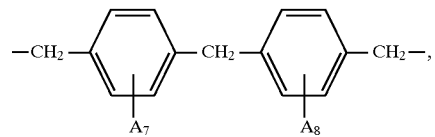

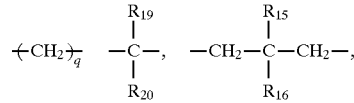

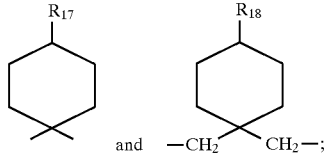

$R^{11}$, $R^{12}$, $R^{13}$ and $R^{14}$ each independently represent hydrogen atom or a linear or branched alkyl group of 1 to 8 carbon atoms; $R^{21}$ and $R^{32}$, $R^{22}$ and $R^{31}$, $R^{23}$ and $R^{34}$ and $R^{24}$ and $R^{33}$, are each the same atom or group; and the atoms or groups of the respective sets each independently represent hydrogen atom or a linear or branched alkyl group of 1 to 8 carbon atoms, in the above formulas, $A_5$, $A_6$, $A_7$ and $A_8$ each independently represent hydrogen atom or a linear or branched alkyl group of 1 to 8 carbon atoms; q represents an integer of 0 or more; $R_{15}$, $R_{16}$, $R_{19}$ and $R_{20}$ each independently represent hydrogen or a linear or branched alkyl group of 1 to 20 carbon atoms; and $R_{17}$ and $R_{18}$ each independently represent hydrogen atom or a linear or branched alkyl group of 1 to 8 carbon atoms, but excluding a case where $R^{25}$ represents methyl group, D represents propan-2-ylidene group, and $R^{11}$, $R^{12}$, $R^{13}$, $R^{14}$, $R^{21}$, $R^{22}$, $R^{23}$, $R^{24}$, $R^{31}$, $R^{32}$, $R^{33}$ and $R^{34}$ all represent hydrogen atom.

7. A polyimide film according to claim 1, wherein, in the formula (IV), $R^{11}$, $R^{12}$, $R^{13}$, $R^{14}$, $R^{21}$, $R^{22}$, $R^{23}$, $R^{24}$, $R^{25}$, $R^{31}$, $R^{32}$, $R^{33}$ and $R^{34}$ all represent hydrogen atom and D is represented by the formula (X):

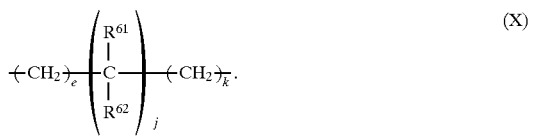

wherein $R^{61}$ is hydrogen atom or a linear or branched alkyl group of 1 to 12 carbon atoms; $R^{62}$ represents a linear or branched alkyl group of 1 to 12 carbon atoms; e and k each independently is 0 to 10, and j is 0 to 20, and when j is 0, the sum of e and k is 2 or more, and when j is one or more, the sum of e and k is 0 or more.

8. A polyimide film according to claim 1, wherein, in the formula (IV), $R^{11}$, $R^{12}$, $R^{13}$, $R^{14}$, $R^{21}$, $R^{22}$, $R^{23}$, $R^{24}$, $R^{25}$, $R^{31}$, $R^{32}$, $R^{33}$ and $R^{34}$ all represent hydrogen atom, and D is a group represented by the formula (X):

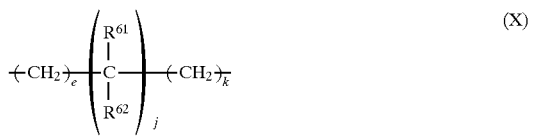

wherein j represents 0, and the sum of e and k is 2 to 10.

9. A polyimide film according to claim 1, wherein, in the formula (IV):

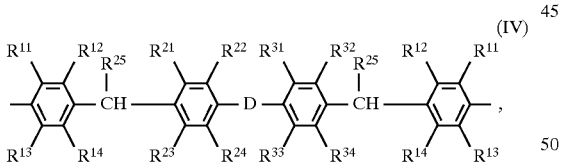

$R^{11}$, $R^{12}$, $R^{13}$, $R^{14}$, $R^{22}$, $R^{23}$, $R^{24}$, $R^{25}$, $R^{31}$, $R^{32}$, $R^{33}$ and $R^{34}$ all represent hydrogen atom, and D is a group represented by the formula (X):

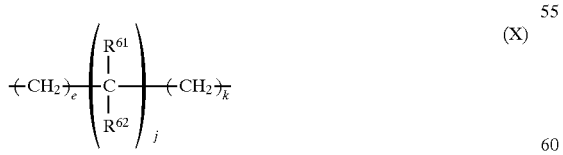

wherein $R^{61}$ represents hydrogen atom, $R^{62}$ represents a linear alkyl group of 1 to 10 carbon atoms, and e, j and k all represent 1.

10. A polyimide film according to claim 1, wherein, in the formula (IV), $R^{11}$, $R^{12}$, $R^{13}$, $R^{14}$, $R^{21}$, $R^{22}$, $R^{23}$, $R^{24}$, $R^{25}$, $R^{31}$, $R^{32}$, $R^{33}$ and $R^{34}$ all represent hydrogen atom, and D is a group represented by the formula (X):

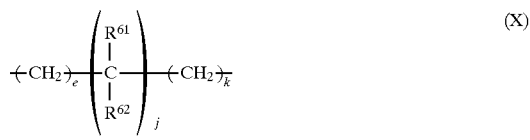

wherein $R^{61}$ represents hydrogen atom, $R^{62}$ represents a linear alkyl group of 1 to 10 carbon atoms, e and k each represent 0 and j represents 1.

11. A polyimide film according to claim 1, wherein in the formula (IV), $R^{25}$ represents a linear alkyl group of 1 to 6 carbon atoms, $R^{11}$, $R^{12}$, $R^{13}$, $R^{14}$, $R^{21}$, $R^{22}$, $R^{23}$, $R^{24}$, $R^{31}$, $R^{32}$, $R^{33}$ and $R^{34}$ all represent hydrogen atom and D represents methylene group.

12. A polyimide film according to claim 1, wherein, in the formula (IV), $R^{25}$ represents a linear alkyl group of 1 to 6 carbon atoms, $R^{11}$, $R^{13}$, $R^{14}$, $R^{21}$, $R^{22}$, $R^{23}$, $R^{24}$, $R^{31}$, $R^{32}$, $R^{33}$ and $R^{34}$ all represent hydrogen atom, D represents cyclohexylene group or 4-alkylcyclohexylene group, and the alkyl therein represents an alkyl group of 1 to 4 carbon atoms.

13. A liquid crystal aligning film composed of a polyimide film according to claim 1.

14. A liquid crystal display element provided with a first substrate having a display picture element electrode formed thereon; a second substrate having an opposed electrode formed at least within a range opposed to said display picture element electrode; an aligning film having an aligning film according to said claim 13 formed on the surfaces of said first and second substrates; and a liquid crystal composition placed between spaces kept so as to have a definite distance.

15. A liquid crystal display element according to claim 14, wherein said liquid crystal composition contains at least one compound selected from a group consisting of compounds represented by formulas (XI), (XII), (XIII) and (XIV):

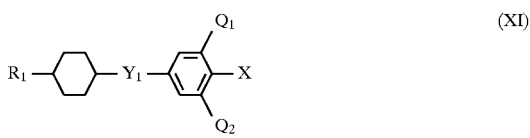

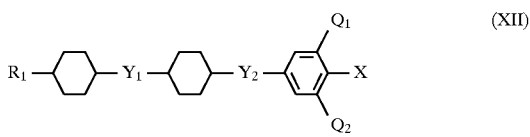

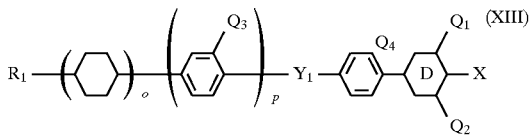

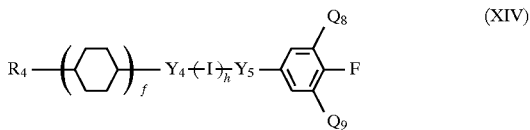

wherein $R_1$ represents an alkyl group of 1 to 10 carbon atoms; X represents F, Cl, $CF_3$, $OCF_3$, $OCF_2H$ or an alkyl group of 1 to 10 carbon atoms; $Q_1$, $Q_2$, $Q_3$ and $Q_4$ each independently represent H or F; o represents 1 or 2; p represents 0 or 1; $Y_1$ and $Y_2$ each independently represent —$CH_2CH_2$—, —CH=CH— or direct bond; ring D represents trans-1,4-cyclohexylene group or 1,4-phenylene group; $R_4$ represents an alkyl group of 1 to 10 carbon atoms; I represents trans-1,4-cyclohexylene group or 1,4-phenylene group; $Q_8$ and $Q_9$ each independently represent H or F; $Y_4$ represents —COO— or direct bond; $Y_5$ represents —COO— or —C≡C—; and f and h each independently represent 0 or 1.

16. A liquid crystal display element according to claim 14, wherein the liquid crystal composition contains one or more liquid crystalline compounds selected from the group consisting of those represented by formulas (XI), (XII), (XIII) and (XIV), and contains as other component(s), one or more liquid crystalline compounds selected from the group consisting of those represented by formulas (XV) and (XVI):

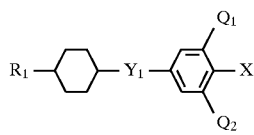 (XI)

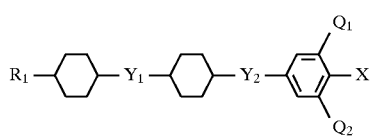 (XII)

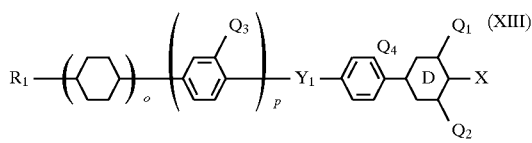 (XIII)

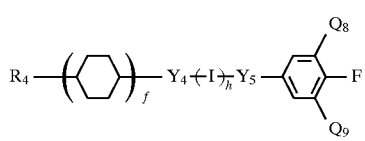 (XIV)

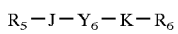 (XV)

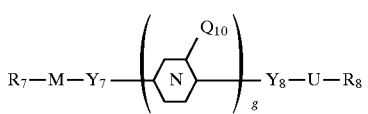 (XVI)

in the formulas (XV) and (XVI), $R_5$ and $R_6$ each independently represent an alkyl group, an alkoxy group or an alkoxymethyl group of 1 to 10 carbon atoms; J represents trans-1,4-cyclohexylene group, 1,3-pyrimidine-2,5-diyl group or 1,4-phenylene group, K represents trans-1,4-cyclohexylene group or 1,4-phenylene group; $Y_6$ represents —C≡C—, —COO—, —CH$_2$=CH$_2$— or direct bond, $R_7$ represents an alkyl group or an alkoxy group of 1 to 10 carbon atoms; $R_8$ represents an alkyl group of 1 to 10 carbon atoms and an optional methylene group (—CH$_2$—) in $R_8$ may be replaced by oxygen atom (—O—), but two or more methylene groups are not continuously replaced by oxygen atom; M represents trans-1,4-cyclohexylene group or 1,3-pyrimidine-2,5-diyl group; rings N and U each independently represent trans-1,4-cyclohexylene group or 1,4-phenylene group; $Y_7$ represents —CH$_2$CH$_2$—, —COO— or direct bond; $Y_8$ represents —C≡C—, —COO— or direct bond; g represents 0 or 1; and $Q_{10}$ represents H or F.

* * * * *